(12) United States Patent
Dao et al.

(10) Patent No.: US 11,758,416 B2
(45) Date of Patent: *Sep. 12, 2023

(54) SYSTEM AND METHOD OF NETWORK POLICY OPTIMIZATION

(71) Applicant: HUAWEI TECHNOLOGIES CO., LTD., Shenzhen (CN)

(72) Inventors: Ngoc Dung Dao, Ottawa (CA); Xu Li, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 36 days.

This patent is subject to a terminal disclaimer.

(21) Appl. No.: 17/231,560

(22) Filed: Apr. 15, 2021

(65) Prior Publication Data

US 2021/0235288 A1    Jul. 29, 2021

Related U.S. Application Data

(63) Continuation of application No. 15/898,444, filed on Feb. 17, 2018, now Pat. No. 10,986,516.

(Continued)

(51) Int. Cl.
*H04W 24/02* (2009.01)
*H04W 24/08* (2009.01)
(Continued)

(52) U.S. Cl.
CPC .......... *H04W 24/02* (2013.01); *H04W 24/08* (2013.01); *H04W 72/535* (2023.01); *H04W 24/10* (2013.01); *H04W 84/12* (2013.01)

(58) Field of Classification Search
None
See application file for complete search history.

(56) References Cited

U.S. PATENT DOCUMENTS 9,854,486 B2   12/2017   Siomina et al.
10,531,365 B2   1/2020   Kaur et al.
(Continued)

FOREIGN PATENT DOCUMENTS

CN   101145977 A   3/2008
CN   102307338 A   1/2012
(Continued)

OTHER PUBLICATIONS

Tno, Huawei, KPN B.V., Importance of load information exchange in energy saving, 3GPP TSG RAN WG3 Meeting #70, Jacksonville, Florida, USA, Nov. 15-19, 2010, R3-103300, 3 pages.
(Continued)

*Primary Examiner* — Scott M Sciacca

(57) ABSTRACT

A network data analytics (NWDA) function and method of policy optimization in a communication network are provided. The NWDA performs data analytics on the communication network traffic, and includes communication interfaces to connect to other network elements in the communication network. The method comprises the NWDA function configured to receive a request for a policy input, send instructions to network elements to obtain network performance measurement data, receive the measurement data from the network elements, and transmit a policy input based on the received measurement data.

23 Claims, 14 Drawing Sheets

Related U.S. Application Data

(60) Provisional application No. 62/469,765, filed on Mar. 10, 2017.

(51) Int. Cl.
*H04W 24/10* (2009.01)
*H04W 72/50* (2023.01)
*H04W 84/12* (2009.01)

(56) References Cited

U.S. PATENT DOCUMENTS

| | | |
|---|---|---|
| 2003/0217128 A1 | 11/2003 | Yanosy |
| 2008/0126379 A1 | 5/2008 | Jain et al. |
| 2010/0015926 A1 | 1/2010 | Luff |
| 2012/0046872 A1 | 2/2012 | Kühn et al. |
| 2012/0158949 A1 | 6/2012 | Lee |
| 2014/0036666 A1 | 2/2014 | Sanda |
| 2014/0344472 A1 | 11/2014 | Lovsen et al. |
| 2015/0207727 A1 | 7/2015 | Roy et al. |
| 2015/0245238 A1 | 8/2015 | Zhang |
| 2015/0249601 A1 | 9/2015 | Tofighbakhsh |
| 2015/0381498 A1* | 12/2015 | Nomura ............ H04L 67/1008 370/217 |
| 2016/0081103 A1* | 3/2016 | Chen ............... H04L 43/0817 370/329 |
| 2016/0088509 A1 | 3/2016 | Jain et al. |
| 2016/0277953 A1* | 9/2016 | Andersson ............. H04L 65/80 |
| 2017/0215094 A1 | 7/2017 | Akoum et al. |
| 2017/0230269 A1 | 8/2017 | Kamath et al. |
| 2017/0337394 A1 | 11/2017 | Wang et al. |
| 2018/0054796 A1 | 2/2018 | Edge |
| 2018/0242177 A1* | 8/2018 | Wu ..................... H04L 43/065 |
| 2018/0262924 A1 | 9/2018 | Dao |
| 2018/0368140 A1* | 12/2018 | Centonza .......... H04W 72/0426 |
| 2019/0222489 A1 | 7/2019 | Shan |
| 2019/0261199 A1* | 8/2019 | Salkintzis ............ H04W 24/08 |
| 2019/0306755 A1 | 10/2019 | Chaudhuri |
| 2020/0045559 A1 | 2/2020 | Kim et al. |
| 2020/0178048 A1 | 6/2020 | Kim et al. |
| 2020/0267518 A1 | 8/2020 | Sabella et al. |
| 2020/0112868 A1 | 9/2020 | Shariat |
| 2020/0374742 A1 | 11/2020 | Chong |
| 2020/0404547 A1 | 12/2020 | Qiao et al. |
| 2021/0306887 A1 | 9/2021 | Kim et al. |

FOREIGN PATENT DOCUMENTS

| | | |
|---|---|---|
| CN | 103107958 A | 5/2013 |
| CN | 104598557 A | 5/2015 |
| CN | 104782168 A | 7/2015 |
| CN | 105828357 A | 8/2016 |
| CN | 105828430 A | 8/2016 |
| CN | 108322287 A | 7/2018 |
| CN | 108347748 A | 7/2018 |
| EP | 2779718 A1 | 9/2014 |
| WO | 2015089802 A1 | 6/2015 |
| WO | WO-2018041000 A1 * | 3/2018 .............. H04W 8/12 |
| WO | 2018141093 A1 | 8/2018 |
| WO | 2018141169 A1 | 8/2018 |
| WO | 2019032968 A1 | 2/2019 |
| WO | 2020057717 A1 | 3/2020 |

OTHER PUBLICATIONS

3GPP TR 23.791 V1.1.0 (Oct. 2018), 3rd Generation Partnership Project; Technical Specification Group Services and System Aspects; Study of Enablers for Network Automation for 5G (Release 16), 102 pages.
3GPP TS 23.502 V0.3.0 (Mar. 2017), 3rd Generation Partnership Project; Technical Specification Group Services and System Aspects; Procedures for the 5G System; Stage 2 (Release 15), 115 pages.
3GPP TR 23.791 V0.4.0:"3rd Generation Partnership Project; Technical Specification Group Services and System Aspects;Study of Enablers for Network Automation for 5G(Release 16)",Jun. 2018,total 32 pages.
"System Architecture for the 5G System; Stage 2"; 3GPP TS 23.501 V15.3.0 (Sep. 2018).
"Procedures for the 5G System; Stage 2"; 3GPP TS 23.502 V15.3.0 (Sep. 2018).
"Study on architecture enhancements for EPS and 5G System to support advanced V2X services"; 3GPP TR 23.786 V0.8.0 (Aug. 2018).
3GPP TR 23.791 V1.0.0 (Sep. 2018), 3rd Generation Partnership Project; Technical Specification Group Services and System Aspects; Study of Enablers for Network Automation for 5G(Release 16), 66 pages.
3GPP TS 23.503 V15.3.0 (Sep. 2018), 3rd Generation Partnership Project; Technical Specification Group Services and System Aspects; Policy and Charging Control Framework for the 5G System; Stage 2(Release 15), 70 pages.
3GPP TS 23.501 V0.3.1 (Mar. 2017),3rd Generation Partnership Project;Technical Specification Group Services and System Aspects-;System Architecture for the 5G System;Stage 2(Release 15), total 97 pages.
ATandT et al: "Network DataAnalytics", 3GPP Draft; S2-171604,3rd Generation Partnership Project (3GPP), MOBILECOMPETENCE CENTRE ; vol. SA WG2, No. Dubrovnik, Croatia; Feb. 13, 2017-Feb. 18, 2017 (Feb. 18, 2017(Feb. 18, 2017), XP051240823, total 6 pages.
Huawei: "Discussion about Big Data Driven NetworkArchitecture", 3GPP Draft; S2-173192-Big Data Driven Network Architecture,3rd Generation Partnership Project (3GPP), France,vol. SA WG2, No. Hangzhou, China; May 15, 2017-May 19, 2017 May 9, 2017 (May 9, 2017), XP051268656, total 11 pages.
"Study on Architecture for Next Generation System"; 3GPP TR 23.799 V2.0.0 (Nov. 2016).
"System Architecture for the 5G System"; 3GPP TS 23.501 V0.3.0 (Feb. 2017).

* cited by examiner

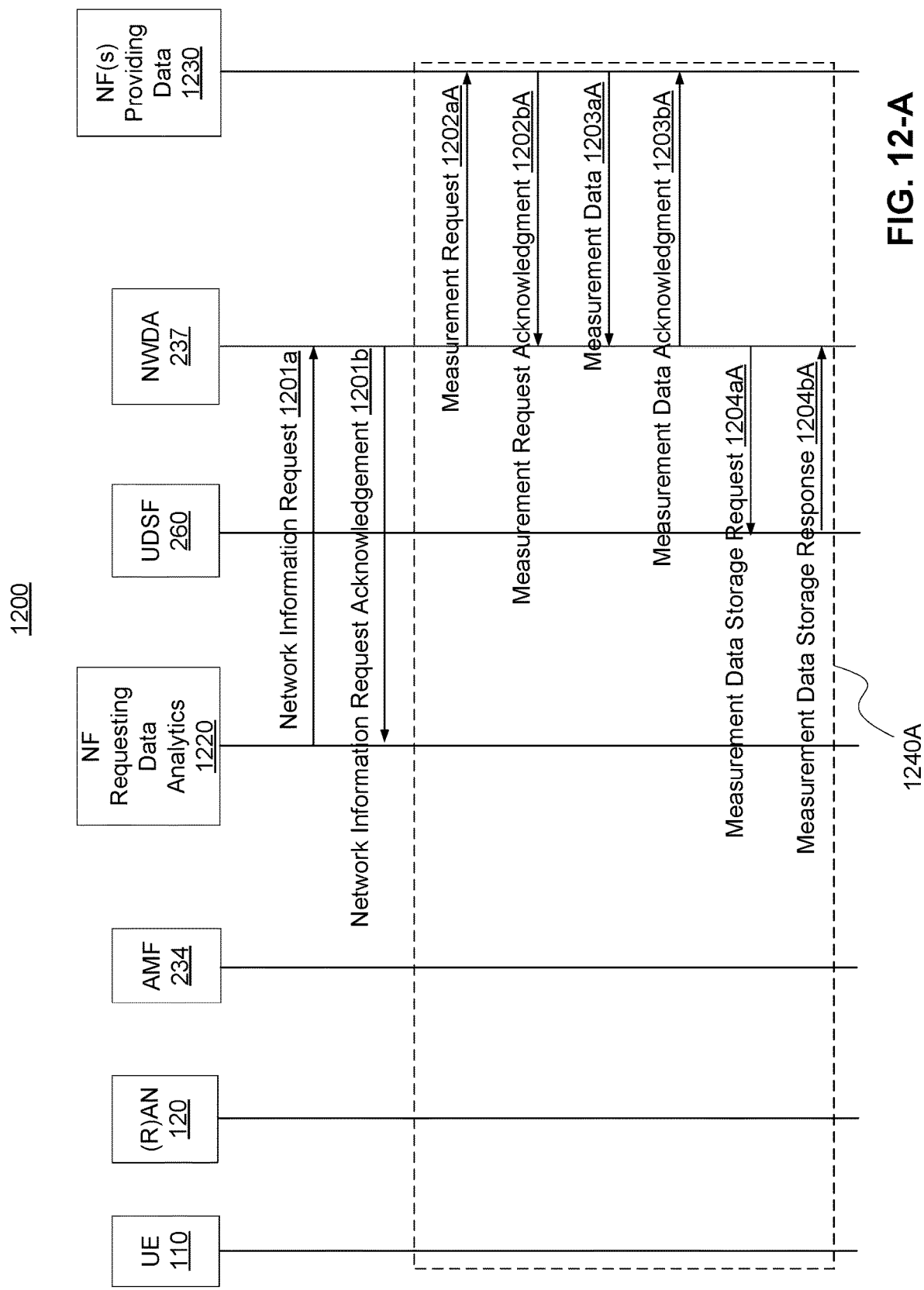
FIG. 12-A

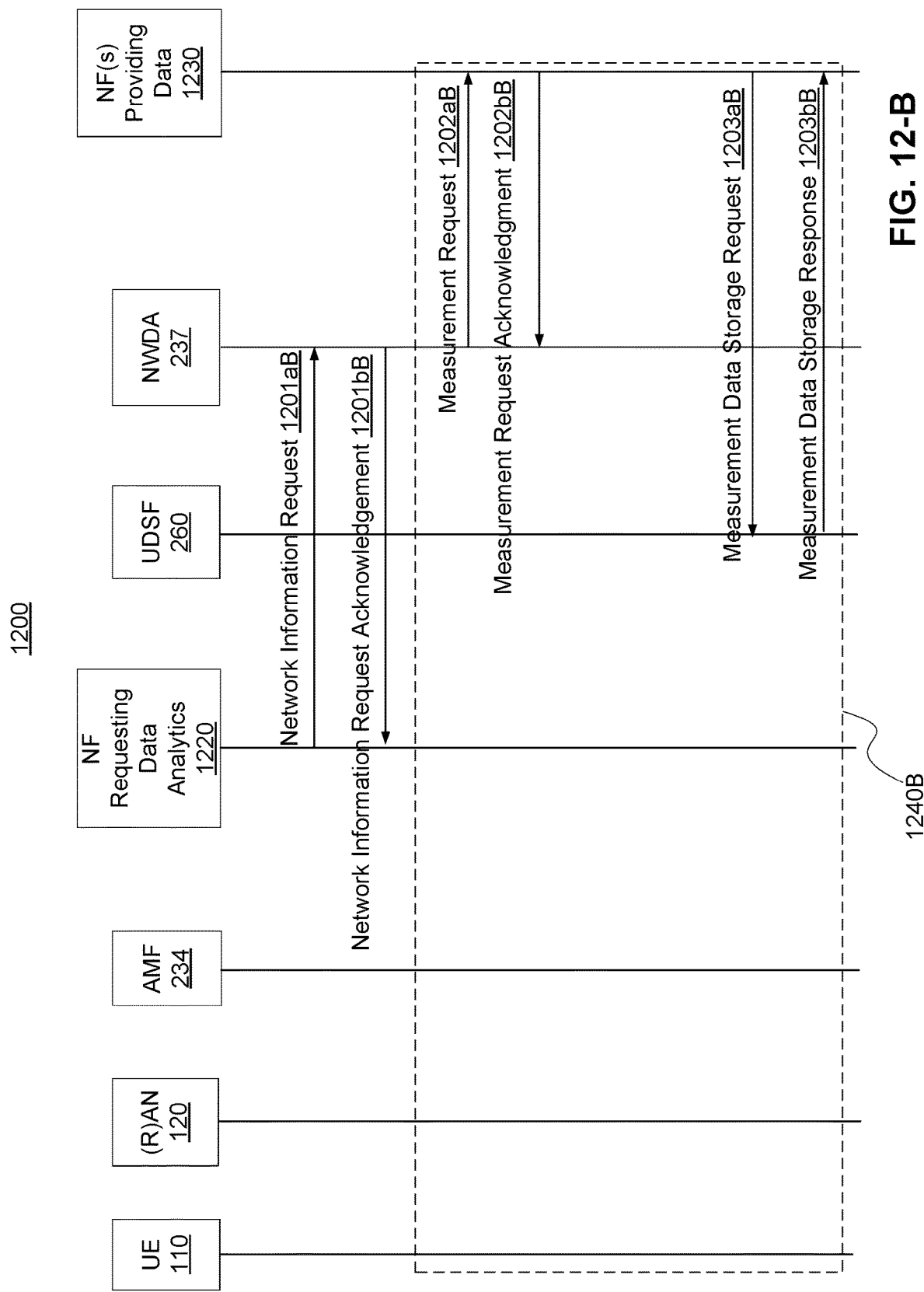
FIG. 12-B

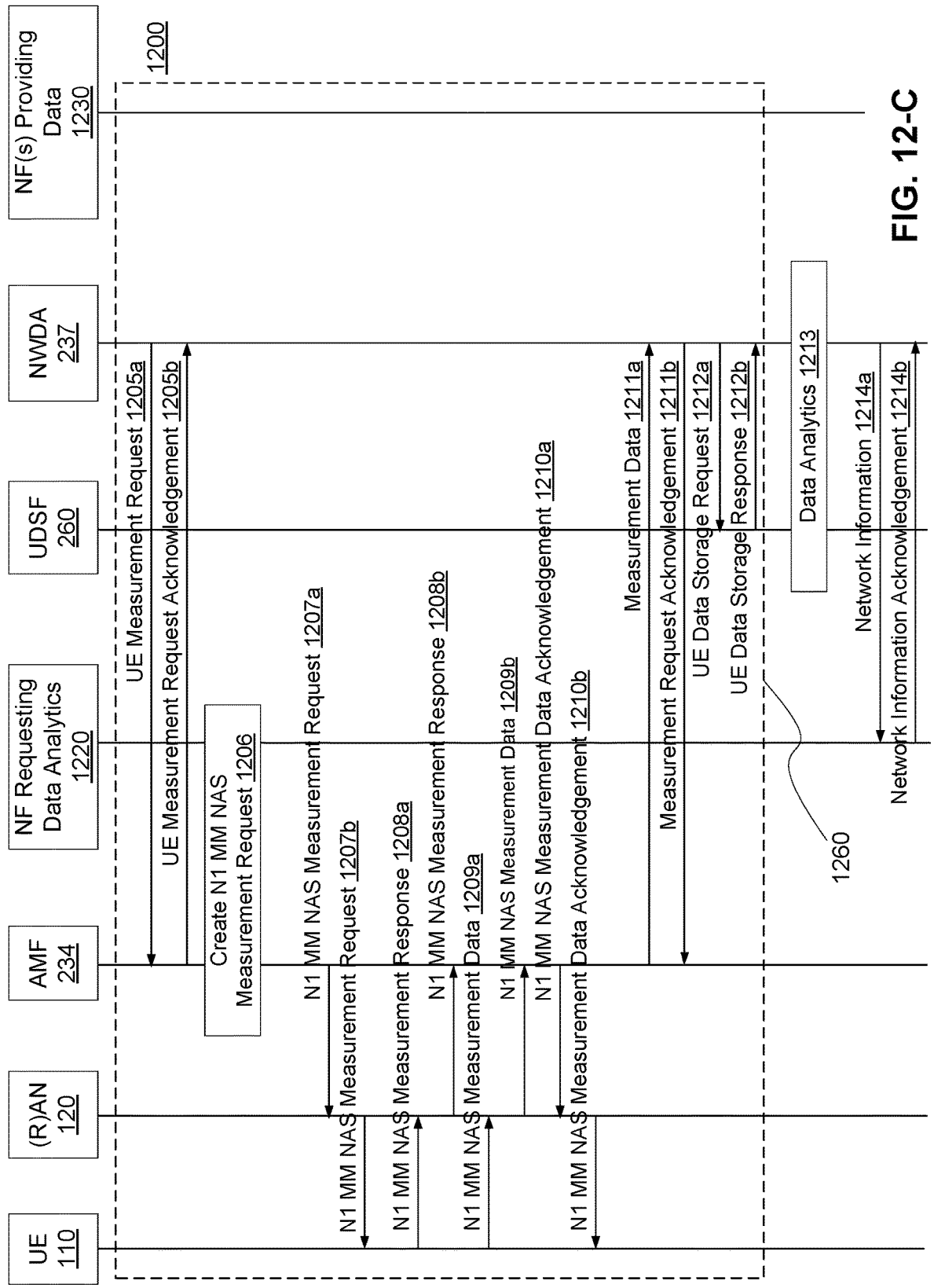
FIG. 12-C

SYSTEM AND METHOD OF NETWORK POLICY OPTIMIZATION

CROSS REFERENCE TO RELATED APPLICATIONS

This application is a continuation of U.S. patent application Ser. No. 15/898,444 filed on Feb. 17, 2018, entitled "System and Method of Network Policy Optimization" which claims priority from U.S. Provisional Patent Application Ser. No. 62/469,765 filed on Mar. 10, 2017 and entitled "System and Method of Network Policy Optimization," the contents of which are incorporated herein by reference in their entirety.

FIELD OF THE INVENTION

The present invention pertains to the field of network communications, and in particular to a system and method of network policy optimization.

BACKGROUND

The mobile network operators control the operation of mobile networks by implementation of control policies, including quality of service (QoS) management policy, charging policy, traffic routing policy, and others. The control policies can be static or dynamic in nature.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide an improved system and methods of policy optimization in a communications network.

In accordance with embodiments of the present invention, there is provided a method of policy optimization in a communication network. The method comprises a network data analytics (NWDA) function configured to receive a request from a policy and control function (PCF) for a policy input associated with a packet data unit (PDU) session associated with at least one network node connected to the communication network, transmit a request to receive a measurement data from the at least one network node connected to the communication network, receive a measurement data response from the network node in response to the request, and transmit a policy input to the PCF. The policy input is based on the measurement data response.

In accordance with embodiments of the present invention, there is also provided a method of policy optimization in a communication network. The method comprising a NWDA function configured to receive measurement data from at least one network entity in the communication network and generate a network traffic policy input based on the measurement data. In some embodiments, the measurement data is received in response to a request sent by the NWDA function to the network element for said measurement data. In some embodiments, the NWDA function is further configured to transmit instructions to a network element to obtain the measurement data. In some embodiments, the method further includes storing measurement data in an undefined data storage function repository. In some embodiments, the NWDA function is further configured to: receive configuration data from a network management function (NMF); obtain a topology of the communication network based on the configuration data; estimate a capacity of an access network node based on the measurement data; estimate a number of packet data unit (PDU) sessions for a traffic type in at least one access node to the communication network and in at least one core network in the communication network; and perform a traffic engineering optimization procedure to estimate a data rate to be assigned to the PDU sessions for different times of day.

In accordance with embodiments of the present invention, there is also provided a communication network. The communication network comprises a NWDA function, a user plane function (UPF) connected to the NWDA function via a first interface, a unified data management (UDM) function connected to the NWDA function via a second interface, an access and mobility function (AMF) connected to the NWDA function via a third interface, a session management function (SMF) connected to the NWDA function via a fourth interface, and a policy and control function (PCF) connected to the NWDA function via a fifth interface. In some embodiments the NWDA function further includes at least one of: a sixth interface to connect to a network management function (NMF); a seventh interface to connect to an application function (AF); and an eighth interface to connect to an undefined data storage function (UDSF).

In accordance with embodiments of the present invention, there is also provided a method of policy optimization in a communication network. The method includes requesting, by a network data analytics function (NWDA), measurement data from a plurality of network entities. The method further includes receiving, by the NWDA, measurement data from at least one of the plurality of network entities. The method further includes sending a policy recommendation to at least one control plane (CP) function based on an analysis of the received measurement data. In some embodiments, receiving measurement data from at least one of the plurality of network entities includes obtaining measurement data from at least one of the plurality of network entities directly. In some embodiments, receiving measurement data from at least one of the plurality of network entities includes requesting measurement data from a data storage function, wherein the data storage function has stored measurement data received from the at least one of the plurality of network entities; and receiving the stored measurement data. In some embodiments, the received measurement data includes at least one of network entity data, operation data, maintenance data, and measurement reports. In some embodiments, the method further includes receiving configuration data from a network management function (NMF); obtaining a topology of the communication network based on the configuration data; estimating a capacity of an access network node based on the measurement data; estimating a number of packet data unit (PDU) sessions for a traffic type in at least one access node to the communication network and in at least one core network function in the communication network; and performing a traffic engineering optimization procedure to estimate a data rate to be assigned to the PDU sessions for different times of a day. In some embodiments, the method further includes sending an instruction to the at least one of the plurality of network entities to generate and store a measurement report containing the measurement data; and receiving an acknowledgement message from the at least one of the plurality of network entities. In some embodiments, wherein the method further includes receiving a service request from a network management function (NMF); creating a filter based on the service request; sending a measurement data request to the data storage function for filtered data; receiving a measurement data response from the data storage function, wherein the measurement data response comprises the filtered data; and sending a service response to the NMF. In some embodiments, the at least one of the plurality of network entities comprises a plurality of the network entities. In some embodiments, the plurality of the network entities are selected from the group comprising: electronic devices, Radio Access Network functions, User Plane functions, Control Plane Functions, and Management Plane Functions. In some embodiments, the method further includes receiving a policy recommendation subscription request from a policy and control function (PCF); sending a policy recommendation subscription acknowledgment message to the PCF; sending a measurement data request to the data storage function to retrieve stored measurement data that satisfies the request; receiving a measurement data response from the data storage function; sending a policy recommendation message to the PCF based on the received measurement data response and the policy recommendation subscription request; and receiving a policy recommendation acknowledgement message from the PCF.

In accordance with embodiments of the present invention, there is also provided a network element in a communication network. The network element includes a processor; a network interface for communicating with other network entities; and non-transient machine readable memory storing machine readable instructions, which when executed by the processor, configure the network element to implement a network data analytics function (NWDA). Thus network element is configured to perform the following steps: Requesting, by a network data analytics function (NWDA), measurement data from a plurality of network entities; receiving, by the NWDA, measurement data from at least one of the plurality of network entities; and sending a policy recommendation to at least one control plane (CP) function based on an analysis of the received measurement data. In some embodiments, the instructions for configuring the network element for receiving measurement data from at least one of the plurality of network entities includes instructions for obtaining measurement data from at least one of the plurality of network entities directly. In some embodiments, the instructions for configuring the network element for receiving measurement data from at least one of the plurality of network entities includes instructions for requesting measurement data from a data storage function, wherein the data storage function has stored measurement data received from the at least one of the plurality of network entities; and receiving the stored measurement data. In some embodiments, the received measurement data comprises at least one of network entity data, operation data, maintenance data, and measurement reports. In some embodiments, the machine readable instructions further configure the NWDA for: receiving configuration data from a network management function (NMF); obtaining a topology of the communication network based on the configuration data; estimating a capacity of an access network node based on the measurement data; estimating a number of packet data unit (PDU) sessions for a traffic type in at least one access node to the communication network and in at least one core network function in the communication network; and performing a traffic engineering optimization procedure to estimate a data rate to be assigned to the PDU sessions for different times of a day. In some embodiments, the machine readable instructions further configure the NWDA for: sending an instruction to the at least one of the plurality of network entities to generate and store a measurement report containing the measurement data; and receiving an acknowledgement message from the at least one of the plurality of network entities. In some embodiments the machine readable instructions further configure the NWDA for: receiving a service request from a network management function (NMF); creating a filter based on the service request; sending a measurement data request to the data storage function for filtered data; receiving a measurement data response from the data storage function, wherein the measurement data response comprises the filtered data; and sending a service response to the NMF. In some embodiments, the at least one of the plurality of network entities comprises a plurality of the network entities. In some embodiments, the plurality of the network entities are selected from the group comprising: electronic devices, Radio Access Network functions, User Plane functions, Control Plane Functions, and Management Plane Functions. In some embodiments, the instructions for configuring the network element for receiving measurement data from at least one of the plurality of network entities includes instructions for the machine readable instructions further configure the NWDA for: receiving a policy recommendation subscription request from a policy and control function (PCF); sending a policy recommendation subscription acknowledgment message to the PCF; sending a measurement data request to the data storage function to retrieve stored measurement data that satisfies the request; receiving a measurement data response from the data storage function; sending a policy recommendation message to the PCF based on the received measurement data response and the policy recommendation subscription request; and receiving a policy recommendation acknowledgement message from the PCF.

BRIEF DESCRIPTION OF THE FIGURES

Further features and advantages of the present invention will become apparent from the following detailed description, taken in combination with the appended drawings, in which:

FIG. 12-A illustrates, in a message flow diagram, an example of signaling procedures for an NF function to request data analytics from the NWDA, in accordance with embodiments of the present invention where data are collected from NF(s);

FIG. 12-B illustrates, in a message flow diagram, another example of signaling procedures for an NF function to request data analytics from the NWDA, in accordance with embodiments of the present invention where data are collected from NF(s);

FIG. 12-C illustrates, in a message flow diagram, an example of signaling procedures for an NF function to request data analytics from the NWDA, in accordance with embodiments of the present invention where data are collected from UE(s)

It will be noted that throughout the appended drawings, like features are identified by like reference numerals.

DETAILED DESCRIPTION

Figure 1:
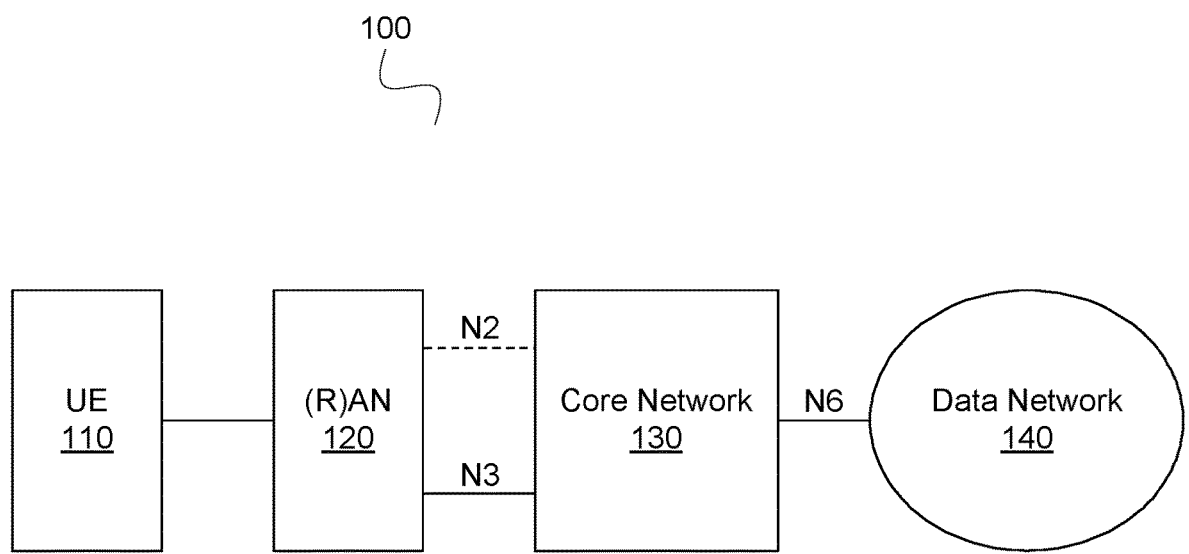
FIG. 1 illustrates, in a component diagram, an example of a communication network architecture.

Embodiments of the present invention are directed towards systems and methods of network policy optimization.

In an Evolved Packet Core (EPC) network, as defined by the third Generation Partnership Project (3GPP), and in successors to the EPC, a policy control function (PCF) may receive input from different network entities to make decisions. For example, an application function (AF) providing a service to UEs connected to the EPC may provide traffic characteristics (or expected traffic characteristics) associated with the service; a connected user equipment (UE) may provide UE-related information which may optionally include service level agreement (SLA) information; a session manager (SM) may provide bearer binding information; and nodes within a radio access network (RAN) may provide congestion level indications (or no congestion indications) for UEs.

The PCF is responsible for generating policies that can be transmitted to connected nodes. The policies transmitted by the PCF are typically related to ensuring that the network provides service that meets agreed upon metrics defined by a quality of service (QoS). Some such metrics may include any or all of a guaranteed bit rate (GBR), a maximum bit rate (MBR), an aggregate maximum bit rate (AMBR) and traffic steering rules (which can specify rules for forwarding flows to different radio access technologies (RATs)). The policies transmitted by the PCF may be determined by a process that relies upon the fact that most network traffic is best-effort, e.g., non-real-time video. Only a small percentage of network traffic is provided with a QoS guarantee such as a GBR (e.g., real-time voice and real-time video flows). For most types of best-effort network traffic, a common QoS parameter is MBR, which can be set smaller than AMBR. The AMBR may be set according to an SLA. An SLA may define a guaranteed level of service provided to a UE (or a class of UEs), or to a level of service provided to network traffic originating at a particular source (e.g., a video streaming server). Therefore, when the policy decisions made by a PCF are only used to ensure service levels for a small number of traffic flows, the decision process may be relatively simple. However, as the number of QoS flows increases (either absolutely or in comparison to the number of best effort (BE) flows), or as the volume of data carried in QoS flows increases (e.g., when the number of video flows is a large percentage of the total traffic in the network), the conventional approach to performing policy decisions in the PCF may not work as well. It should be understood that the term QoS flow refers to a traffic flow with a specified QoS requirement. There can be several different QoS flow types, with best effort being one type. It is also noted that traffic flow and data flow are used interchangeably.

For example, consider a user equipment, UE-1, that is receiving a video stream containing content (such as a movie) from a video streaming service for 2 hours, between 2 pm and 4 pm, and that the network load is 50% of network capacity at 2 µm and 95% of network capacity at 3 pm. Because UE-1 started the video session at 2:00 pm, UE-1 may continue receiving the video stream at a rate that allows for rendering the video with a satisfactory quality as long as the network is not overloaded. However, if another user equipment, UE-2, starts a new video session at 3 pm, it may not experience the same QoS. A video streaming server using the transmission control protocol (TCP) and Internet Protocol (IP) protocol suite, will start the session by measuring an average packet delay. When UE-1 started its session, the network was relatively lightly loaded. However, when UE-2 starts its session, the network is highly loaded (95% utilization). Thus, the TCP sending rate associated with the video flow to UE-2 may be much lower than the rate associated with the video flow to UE-1. This could create an unfair resource usage between UE-1 and UE-2.

In order to assign network resources fairly to data flows, the PCF may set policies taking the network topology into account. In some embodiments, the network topology may be a logical network topology. The PCF may also set QoS and traffic routing policies dynamically. The network topology includes network nodes (user plane function (UPF) and RAN nodes), how the network nodes are connected by network links (e.g. interfaces or reference points), and the capacity of these links. It is noted that the terms "interface" and "reference point" are used interchangeably in this specification.

To allow for dynamic changes to network policies, the PCF can receive notification of congestion in the network. The PCF may obtain an indication of the level of congestion from reports about congestion on links carrying the flows (e.g., video flows). The PCF function may run a traffic engineering (TE) optimization function (or may instruct the execution of a TE optimization process in another network function), taking into account any or all of the network topology, current data rates associated with long-lived flows (such as video flows), congestion level reports, UE information (e.g., screen resolution, SLA), QoS requirements associated with the flows in the network (such as an allocation and retention priority (ARP), MBR, etc.), averaged throughput of RAN nodes (which in some embodiments can be obtained by monitoring the past load measurement reports) and the processing capacity of the UPF.

FIG. 1 illustrates, in a component diagram, an example of a communication network architecture 100. The communication network architecture 100 comprises a user equipment (UE) 110, an access network (AN) 120, a core network (CN) 130 and a data network (DN) 140. One example of an AN 120 is a radio access network (RAN). The term (R)AN is used in this description to designate that either an AN and/or a RAN may apply. The UE 110 communicates with a node in the DN 140 (typically to obtain a service) via connections through a node in the (R)AN 120 and then through the CN 130. Message packet data units (PDUs) between the UE 110 and a node in DN 140 are transmitted through the (R)AN 120 and CN 130. A DN 140 may be a public network operator, a private data network, an intra-operator data network, or any other type of data network. It should also be understood that in some embodiments the DN 140 can be the Internet.

In an uplink (UL) direction, User Plane (UP) PDUs addressed to a server or node in DN 140 are transmitted from the UE 110 to a node within (R)AN 120 via a communication link. The (R)AN 120 node then forwards the received UP PDUs to a node within CN 130. In some embodiments, the node within CN 130 is a gateway, such as a packet gateway, that forwards the UP PDUs towards the node in DN 140 to which the PDU is addressed. In a downlink (DL) direction, DL PDUs are transmitted from a node in the DN 140 to a node in the CN 130 that then forwards the DL PDUs to a node in the (R)AN 120 that then forwards the DL PDUs to the UE 110. Control Plane (CP) functions within the CN 130 (often implemented as network functions instantiated upon a computing resource within the CN 130) configure UP functions within the CN 130 to configure how traffic is handled. In some embodiments, the configuration of UP functions can be done on a per session or per flow basis. One or more UP functions per session may be activated and configured by a network function within the CP for a given UP scenario.

The connections between the components of the communication network 100 may be any suitable communication channel. For next generation networks, the connection between a node in the (R)AN 120 and a node in the CP of the CN 130 may be via a logical interface (in some embodiments called an N2 reference point). The connection between a node in the (R)AN 120 and the UP of the CN 130 may be via another logical interface (in some embodiments called an N3 reference point). The connection between the UP of the CN 130 and a node in the DN 140 may be via yet another logical interface (in some embodiments called an N6 reference point). It will be understood that the nature of the connection between UE110 and a node in (R)AN 120 may depend on the type of Radio Access Technology (RAT) (or simply the access technology) used in the (R)AN 120.

Figure 2:
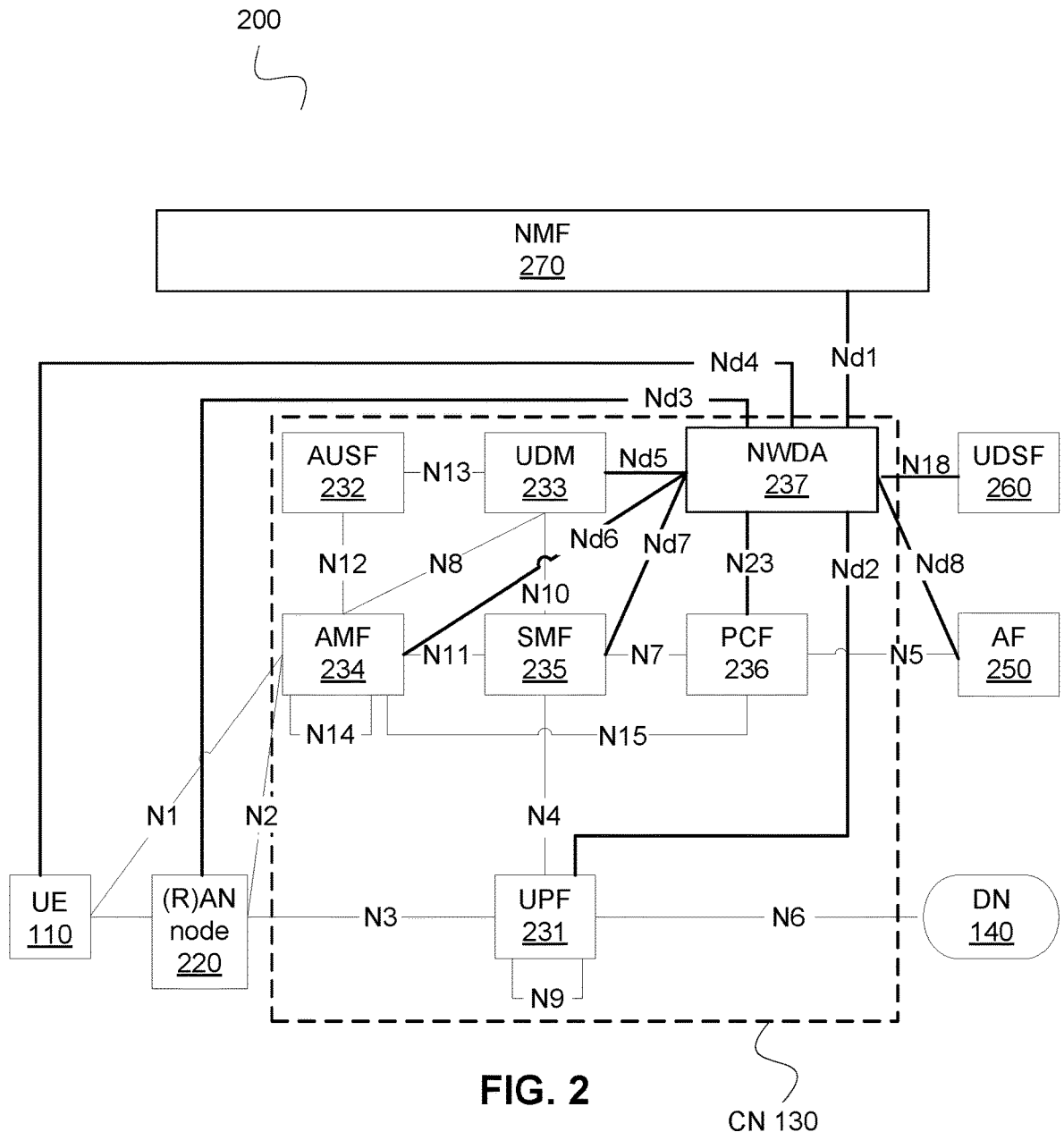
FIG. 2 illustrates, in a component diagram, a more detailed example of a communication network architecture, in accordance with embodiments of the present invention.

FIG. 2 illustrates, in a component diagram, a more detailed example of a communication network architecture 200, in accordance with embodiments of the present invention. The communication network architecture 200 is a next generation (such as fifth generation (5G) wireless networks) network architecture that includes a function in CN 130 that supports data analytics. The CN 130 connects to a (R)AN node 220 (within the (R)AN 120) which in turn provides access services to the UE 110. The communication network architecture 200 may include an Application Function (AF) 250 that is external to the CN 130 (and in some instances may be in DN 140). The communication network architecture 200 may also include an Unstructured Data Storage Function (UDSF) 260, and a Network Management Function (NMF) 270 that may be external to the CN 130. In some embodiments, the UDSF 260 and the NMF 270 may be internal to the CN 130. The CN 130 comprises a User Plane Function (UPF) 231 and CP functions. The CP functions shown in this illustrative embodiment include an AUthentication Server Function (AUSF) 232, a Unified Data Management (UDM) Function 233, an Access and Mobility management Function (AMF) 234, a Session Management Function (SMF) 235, a Policy Control Function (PCF) 236, and a NetWork Data Analytics (NWDA) function 237. It is noted that the term NWDA function is also sometimes referred to as a NWDAF.

The UPF 231 is representative of any of a number of different user plane functions. Different UPFs can be used to provide functions such as mapping IP packets to QoS flows, forwarding packets, traffic measurement and preparing and sending reports. The (R)AN node 220 provides an air interface connection for the UE 110, and forwards packets between the UE 110 and functions within the CN 130. Those skilled in the art will appreciate that as illustrated, the RAN node 220 can use the N3 interface to forward packets to (and receive packets from) UPF 231, and also use the N2 interface to connect to the AMF 234. The AUSF 232 provides security functions, such as authenticating the UEs 110, and generating security or encryption keys for distribution to connected UEs 110 and at least one other node. In some embodiments, nodes in the (R)AN 120 and CN 130 will be provided different keys associated with a UE 110, and the UE 110 will be provided both keys. It should also be understood that security keys may be generated for communications over interfaces between other network nodes (e.g., for communications between the UPF 231 and a node in the DN 140 over the N6 interface). The UDM 233 provides storage management for network information and user information, and may also provide data that may be used to assist with (provides data to support) security measures to protect the data. The AMF 234 manages the termination of signalling interfaces N1 and N2, the forwarding of signalling messages (in some embodiments these may be one or both of CP and UP signalling messages) from the UE 110 and the (R)AN node 220 to the SMF 235, and the management of mobility and security procedures for the UE 110. The SMF 235 manages establishing the UP connection between the UE 110 and a node or network function (e.g. a DN gateway function) connected to the DN 140. The PCF 236 provides policies to network functions for the handling of a UE's session. Such policies include QoS, mobility management, session management and charging policies. The NWDA 237 function provides data analytics functions that can provide information that can be used in setting policies such as traffic steering and QoS policies. The data analytics functions provided by the NWDA 237 can also provide information that can be used in optimization processes used to generate different policies. The NWDA 237 may also collect statistics from other network components and store the statistics in the UDSF 260.

The AF 250 may be instantiated or installed upon any application server outside the CN 130. In some embodiments of proposed next generation core networks, an AF 250 can be provided an interface to CP functions within the CN 130. This may allow control information to be exchanged between an external application and nodes (such as the PCF 236) within the CN 130. For example, an Internet Protocol (IP) Multimedia Subsystem (IMS) server may be an AF 250.

The UDSF 260 allows for storage of data in a variety of different data formats. Different network functions can use the UDSF 260 for storing data, and each network function that interacts with the UDSF 260 can be provided the ability to define its own data format. The NWDA 237 may collect network measurement reports and store them in the UDSF 260. The NMF 270 may be instantiated or installed upon a server outside the CN 130 (and in some embodiments within the CN 130) and used to configure the operation of the NWDA 237.

The network functions resident within the CN 130 may be implemented as virtual entities on one or more servers. The virtual entities may be created by the execution of stored software instructions on a pool of computing resources. Each network function may be viewed within the network as a distinct entity with logical connections to other entities which may be instantiated on the same or other computing resources. FIG. 2 illustrates one example of possible logical connections (e.g. reference points) between some of the network functions. Table 1 lists reference points used between some of the network elements in FIG. 2.

TABLE 1

Interfaces and reference points used between some network elements of network architecture 200

| Component | Interface or Reference Point | Component |
| --- | --- | --- |
| UE 110 | N1 | AMF 234 |
| (R)AN 120 | N2 | AMF 234 |
| (R)AN 120 | N3 | UPF 231 |
| UPF 231 | N4 | SMF 235 |
| PCF 236 | N5 | AF 250 |
| UPF 231 | N6 | DN 140 |
| SMF 235 | N7 | PCF 236 |
| AMF 234 | N8 | UDM 233 |
| UDM 233 | N10 | SMF 235 |
| AMF 234 | N11 | SMF 235 |
| AUSF 232 | N12 | AMF 234 |
| AUSF 232 | N13 | UDM 233 |
| AMF 234 | N14 | AMF 234 |
| AMF 234 | N15 | PCF 236 |
| NWDA 237 | N18 | UDSF 260 |
| NWDA 237 | N23 | PCF 236 |
| NWDA 237 | Nd1 | NMF 270 |
| NWDA 237 | Nd2 | UPF 231 |
| NWDA 237 | Nd3 | (R)AN 120 |
| NWDA 237 | Nd4 | UE 110 |
| NWDA 237 | Nd5 | UDM 233 |
| NWDA 237 | Nd6 | AMF 234 |
| NWDA 237 | Nd7 | SMF 235 |
| NWDA 237 | Nd8 | AF 250 |

The reference points, Nd1 to Nd8, may be implemented as logical links to the NWDA 237. The logical links may represent real links, or portions of real links, or they may be virtual connections that are made up of segments between other network functions. For example, UPF 231 may communicate with the NWDA 237 directly via the Nd2 reference point. In other embodiments, the NWDA 237 may communicate directly with a smaller set of functions, and rely upon the ability of these functions to forward the messages and instructions to other functions. In one such embodiment, the UPF 231 may communicate over the N4 interface with the SMF 235 that would process information in the communication. Once processed, the SMF 235 would communicate the information (either as originally received or as modified with the process) over the N7 interface to the PCF 236. The PCF 236 may then also process the information and send a communication (having the original or modified information) to the NWDA 237 over the N23 interface. Alternatively, the UPF 231 may also communicate over the N4 interface to the SMF 235 that in turn (after processing the received communication) communicates over the Nd7 reference point with the NWDA 237. Yet alternatively, the connection between the NWDA 237 and the UPF 231 could be routed through a plurality of different data centers in which other functions are instantiated. Similarly, in some other embodiments, the UE 110 may communicate with the NWDA 237 directly via the Nd4 reference point. Alternatively, the UE 110 may also communicate over the N1 reference point with the AMF 234 that in turn communicates over the Nd6 reference point with the NWDA 237. Yet alternatively, the connection between the NWDA 237 and the UE110 may be routed through the N1 reference point, N11 reference point and Nd7 reference point. It is understood that the logical connection labels may be renamed by standards bodies, such as the 3GPP. For example, reference points Nd1 to Nd8 may be renamed with a label of the format "Nx", where "x" is an integer.

The reference points, Nd1 to Nd8, are point-to-point logical reference points, which can be used to describe messages exchanged between two network entities. In 5G wireless networks, service-based interfaces are used to send messages between two functions, such as functions in CP. For example, a CP function, such as NWDA 237, can provide services to other functions, such as SMF 235, PCF 236, and AMF 234. Therefore, the same service that the NWDA 237 may provide to a CP function, such as PCF 236, may also be provided to some other CP functions, such as SMF 235.

The NMF 270 may send, over the Nd1 reference point, instructions to instantiate and to configure the operation of the NWDA 237 function. The NMF 270 may also send (R)AN 120 and CN 130 configuration data to the NWDA 237. The (R)AN 120 configuration data may include (R)AN nodes 220 configuration data and (R)AN 120 topology data. (R)AN nodes 220 configuration data may include (R)AN node address information (e.g., IP address and at least one of topological and geographical location), spectral resources including the allocated spectrum allotment, carrier frequencies, antenna configuration (e.g. number of transmit and receive antennas) to be used, beamforming technologies (e.g., massive MIMO, single user beamforming, multi-user beamforming) that can be implemented, and processing capacity (e.g., number of GBR voice users, number of GBR video users). (R)AN connection topology information may include information about the links between (R)AN nodes 220, and the capacity and characteristics of physical links (e.g., optical cables, microwave links, millimeter wave (mmWave) links, etc.) used for backhaul or fronthaul connections and networks.

The NMF 270 may also send configuration information associated with core network user plane functions and their topology (e.g., UPF 231 configuration and CN 130 topology) to the NWDA 237 over the Nd1 reference point. UPF 231 configuration information may include UPF address information (e.g., IP address and geographical location), processing capacity (e.g. a number of PDU sessions that can be supported) of input and output ports, and the maximum supported total throughput (bit/second) of input and output ports. CN 130 topology information may include any or all of: the UPFs that have been or will be instantiated, the logical connections among UPFs 231, the capacity of the logical connections (bit/second), transmission technologies of physical layer supporting logical connections (e.g., optical cables, microwave, etc.), and characteristics of logical links (e.g., packet delay, packet loss rate).

The NMF 270 may also send (R)AN 120 and CN 130 connection topology information to the NWDA 237 over the Nd1 reference point. Such topology information may include logical connections among the (R)AN nodes 220 and the UPF(s) 231, and their maximum throughput. The (R)AN 120 and CN 130 connection topology information may also include the physical connections to support logical connections between the (R)AN nodes 220 and the CN 130 nodes (e.g. maximum throughput (bit/second) and characteristics (optical cables, microwave, packet delay, packet loss rate)). The CN 130 connection topology may include logical and physical connections between two CP functions, between a CP function and the UPF 231, and between a CP function and the (R)AN 120.

The NMF 270 may instruct the NWDA 237, via the Nd1 reference point, to collect network entity data. The operation data from the UPF 231, (R)AN node 220, and UE 110 may be sent to the NWDA 237. The NWDA 237 may store the collected data in the UDSF 260. The NMF 270 may instruct the NWDA 237 to send data of certain UE 110, certain (R)AN nodes 220, or the UPF 231 based on certain criteria (such as geographical locations, time period, specific network entities, events, etc.). The NMF 270 may also request the NWDA 237 to provide a QoS policy recommendation for certain criteria, including certain network slices, certain services (such as real-time video calls, real-time voice calls, video streaming services, video streaming services for certain over-the-top (OTT) content providers), certain time periods, or any combination thereof. The NMF 270 may also request the NWDA 237 to provide a prediction of network function resource utilization (such as resource utilization percentage of (R)AN nodes and UPF nodes, and physical links of the transport layer). The NMF 270 may also request the NWDA 237 to provide potential congestion times during the day and the length of congestion in network functions (including user plane functions (e.g., UPF 231 and (R)AN nodes 220), and control plane functions (e.g., AMF 234, SMF 235). The NWDA 237 predicts the network function resource utilization based on reported network entity data from other network entities. Hence the prediction of network function resource utilization may include statistical information representing network function resource utilization in the measurement period and prediction of future network function resource utilization.

The network entity data is the data provided by a network entity. The operation data of a network function is the data generated during the operation of the function with respect to traffic. For example, the operation data of UPF 231 could include the number of QoS flows of a video streaming application at 2:00 PM, the number of QoS flows having measured flow bit rate within a certain range. The maintenance data is the data to track the operation of a network function, such as the resource utilization of memory (e.g. 50% of memory is used within a certain period, 60% of spectrum is used in a (R)AN node within a certain period). The reports are generated by a network function are to carry network entity data. The collected data by the NWDA 237 include any types of network entity data, which include at least maintenance data, and operation data. Accordingly measurement data includes at least one of network entity data, operation data, and maintenance data. Measurement reports include the measurement data. Measurement data relates to data collected by network entities and provided to the NWDA for applying data analytics analysis.

The NWDA 237 may send to the NMF 270, over the Nd1 reference point, any operation data, maintenance data, and reports as requested by the NMF 270. Operation data collected from the CP functions (such as SMF 235, AMF 234, UDM 233), UPF 231, (R)AN nodes 220 and UE 110 may be stored in the UDSF 260. Based on the request of the NMF 270, the NWDA 237 may obtain (either directly from one or more network components or indirectly from data stored in the UDSF 260) and send relevant data to the NMF 270. The NWDA 237 may send its own operational data (e.g. maintenance data) to the NMF 270 about its (NWDA 237) running time to process collected data, its computing and storage resources usage, and the number of requests from PCF 236 that have been processed.

Measurement configuration data may be sent from the NWDA 237 to the UPF 231 over the Nd2 reference point. Such measurement configuration data may include a measurement periodicity (e.g. how often a report is sent to the NWDA 237), a report schedule (e.g. when the measurement report is sent to the NWDA 237), events to be monitored (e.g. congestion events, packet delay events, etc.), an indication of types of reports requested (e.g. logical link usage reports to measure the percentage of utilized capacity of logical links, and duration of full capacity reports to measure the total time during a measurement period a logical link (port) is fully utilized), types of PDU sessions to be monitored (e.g., video sessions, voice sessions, social network sessions, web service sessions, etc.), a number of PDU sessions between a UPF 231 and (R)AN node 220 for each type of PDU sessions (e.g., voice, video, etc.), and the characteristics of PDU sessions (e.g., length, bit rate variations (min and max), etc.). The UPF 231 may, as instructed, send measurement reports to the NWDA 237 over the Nd2 interface.

The Nd2 reference point may be implemented by a direct logical link between the UPF 231 and the NWDA 237. Alternatively, the Nd2 reference point may be implemented indirectly, by using the N4 interface between the UPF 231 and the SMF 235 and the Nd7 reference point between the SMF 235 and the NWDA 237. In some embodiments of indirect implementation, the measurement configuration data sent between NWDA function 237 and UPF 231 are first sent to the SMF 235 and then forwarded to the UPF 231 or the NWDA 237. Yet alternatively, the measurement configuration data from the UPF 231 may be sent to the NWDA 237 via the SMF 235 and the PCF 236.

In an alternate embodiment, if UPF 231, or any other function, has access to the UDSF 260, the NWDA 237 may request, using an instruction, that the UPF 231 send report data to the UDSF 260. This instruction may include a specification of how the report data is to be formatted or structured. This instruction can include an indication as to when (and possibly how often) the report data is to be sent. The NWDA 237 can then obtain the report data (in some embodiments at fixed intervals) from the USDF 260. This instruction to interact directly with the UDSF 260 can be implemented with any of the network functions (NF) that the NWDS 237 interacts with, so long as the NF has the ability to communicate with the UDSF 260.

Measurement configuration data may be sent by the NWDA 237 to (R)AN nodes 220. Such measurement configuration data may include a measurement periodicity (e.g. how often the report is sent from the (R)AN node 220 to the NWDA 237), a report schedule (e.g. when the measurement report is sent by the (R)AN node 220 to NWDA 237), events to be monitored (e.g. congestion events, packet delay events, etc.), a radio resource link usage report that measures the statistics of spectrum utilization (e.g., the average and cumulative distribution function (CDF) of the spectrum usage), statistics of total throughput in bit/second (e.g. the sum of throughput of all UEs 110) of (R)AN nodes 220 (such as average throughput, variance and CDF of throughput), types of PDU sessions to be monitored (e.g., video sessions, voice sessions, social network sessions, web service sessions, etc.), a number of PDU sessions for each type of monitored PDU sessions (e.g., voice, video, etc.), characteristics of PDU sessions (e.g., length, bit rate variations (min and max), etc.), and UE-based monitoring data (e.g. per-UE network resource usage and PDU sessions). The (R)AN node 220 may, as instructed, send measurement reports to the NWDA 237 over the Nd3 reference point.

The Nd3 reference point may be implemented by a direct logical link between the R(AN) node 220 and the NWDA 237, or by indirect interfaces, for example via the AMF 234. In some embodiments of indirect implementation, the measurement configuration data sent from (R)AN 120 to the NWDA 237 are first sent to the AMF 234, then the AMF 234 may forward the messages to the SMF 235, then the SMF 235 may forward the messages to NWDA 237.

The UE 110 may send QoS and/or QoE reports to the NWDA 237 over the Nd4 reference point. The QoS and/or QoE reports may include the geographical location of the UE 110. The QoS parameters may include packet loss rate, packet delay, and other parameters measured at the UE 110. The QoE parameters may be defined by specific applications. For example, video streaming services may define an initial video buffering time, a total interruption time (total buffering time), a number of interruptions, video bit rates, and bit rate changes during the streaming sessions. The UE 110 may convert the QoE parameters into a single scalar QoE level (for example, from 1 to 5) and send that value to the NWDA 237. The QoS level may be referred as Mean Opinion Score (MOS) as defined by International Telecommunications Union (ITU), or by some proprietary MOS model of the network providers or by a third party service provider. The reports from the UE 110 may include an identifier of the UE, such as UE identifiers defined in 3GPP TS 23.501 (SUPI, GPSI), the information of PDU session such as PDU session type (IP PDU Session, Ethernet PDU Session, or Unstructured PDU Session), packet flow description, DNN, start and end time of PDU session, information of QoS flows (such as packet filters of a packet filter sets of QoS flows).

In the QoS and/or QoE reports of the UE 110, the geographical location of the UE 110 may be represented by one or combinations of the following information: the GPS location provided by the GPS device of the UE, the (R)AN address (e.g. (R)AN Node Identifier) that served the UE. Note that the (R)AN node may include any radio nodes of different radio access technologies (RAT) such as 5G, 4G, 3G, 2G, WiFi.

Similarly, the Nd4 reference point may be implemented by a direct logical link between the UE110 and the NWDA 237, or by indirect interfaces, for example via the (R)AN 120 and the AMF 234. In some embodiments of an indirect implementation, the QoS and/or QoE reports sent from the UE 110 to the NWDA function 237 are first sent to the (R)AN 120, which is carried by a radio control channel of the (R)AN 120. The (R)AN 120 may forward the QoS and/or QoE reports to the AMF 234 via the N2 interface, then the AMF 234 may forward the QoS and/or QoE to the SMF 235 via the N11 interface and the SMF 235 may further forward the QoS and/or QoE reports to the NWDA 237 via the Nd7 reference point. Alternatively, the AMF 234 may forward the QoS and/or QoE reports to the NWDA function 237 over the Nd6 reference point.

Vice versa, in some embodiments, the NWDA 237 may send QoS and/or QoE reports to the AMF 234 via the Nd6 reference point. The AMF 234 may forward the QoS and/or QoE reports to the (R)AN 120 over the N2 interface. Then the (R)AN 120 may forward the QoS and/or QoE reports to the UE 110 by using a radio control channel of the air interface. Alternatively, the NWDA function 237 may send QoS and/or QoE reports to the SMF 235 over the Nd7 reference point. The SMF 235 may forward the QoS and/or QoE reports to the AMF over the N11 interface, and then the AMF 234 may forward the QoS and/or QoE reports to the UE 110 over the N1 interface.

Measurement configuration data may be sent from the NWDA 237 to the UE 110. Such measurement configuration data may include a measurement periodicity (e.g. how often the report is sent from the UE 110 to the NWDA 237), a report schedule (e.g. when the measurement report is sent from the UE 110 to the NWDA 237), events to be monitored (e.g. a successful handover, a handover failure, congestion events, packet delay events, poor radio coverage (e.g. the geographical locations where a downlink control signal was below a threshold), and data rate coverage (e.g. the downlink and/or uplink data rate at geographical locations)), radio coverage measurements (e.g. ability to receive a downlink control signal at geographical location), types of PDU sessions to be monitored (e.g. video sessions, voice sessions, social network sessions, web service sessions, etc.), a number of PDU sessions for each type of monitored PDU sessions (e.g. voice, video, etc.), characteristics of PDU sessions (e.g. length, bit rate variations (min and max), etc.), report QoS parameters (e.g. packet delay, packet loss rate, etc.), and report QoE parameters (e.g. which type of PDU sessions (video, voice, etc.). For example, the QoE parameters may include an initial buffering time for a PDU session, an average data rate for that PDU session, a number of video interruptions during that PDU session, and a total time of video interruptions (e.g. buffering time)). The UE 110 may, as instructed, send measurement reports to the NWDA 237 via the Nd4 reference point.

The NWDA 237 may request subscriber statistics from the UDM 233 over the Nd5 reference point. For example, the NWDA 237 may request the number of UEs 110 using certain services (e.g. voice, video, data, etc.), or having certain SLAs. The UDM 233 may send subscriber statistics responses to the NWDA 237 over the Nd5 reference point.

The NWDA 237 may send measurement configuration data to the AMF 234. Such measurement configuration data may include a measurement periodicity (e.g. how often the report is sent from the AMF 234 to the NWDA 237), and report scheduling (e.g. when the measurement report is sent by the AMF 234 to the NWDA 237). Monitoring parameters may include a number of handovers, statistics of UE 110 active periods (e.g. the duration a UE 110 stays in a connected state of a connection management (CM) state (e.g. a CM-CONNECTED state), a number of registration requests, a number of service requests, a number of service requests rejected, etc.). UE 110 statistics may include UE distributions (e.g. a number of UEs 110 in specific (R)AN nodes 220, geographical areas, or tracking areas), a number of active UEs 110 (in the CM-CONNECTED state), and a number of idle UEs 110 (in an idle state of a CM state (e.g. a CM-IDLE state)). The AMF 234 may, as requested, send reports to the NWDA 237 over the Nd6 interface. The Nd6 reference point may be used to send measurement requests from the NWDA 237 to the UE 110. In some embodiments, the NWDA 237 may send one common measurement request, which can be distributed by the AMF 234 to many UEs that have performed registration procedure with the system through the AMF 234. When the AMF 234 receives the measurement request from the NWDA 237, the AMF 234 may generate many Non-Access-Stratum NAS messages, each for one UE. Alternatively, the AMF 234 may send multiple messages over the N2 reference point (referred to hereinafter as N2 messages), each containing a measurement request for each (R)AN node 220 serving a number of UEs. The (R)AN node 220 may use a multicast or broadcast channel to send the measurement message to each of the UEs.

The NWDA 237 may send measurement configuration data to the SMF 235 over the Nd7 reference point. Such measurement configuration data may include a measurement periodicity (e.g. how often the report is sent from the SMF 235 to the NWDA 237), and a report schedule (e.g. when the measurement report is sent by the SMF 235 to the NWDA 237). Monitoring parameters may include UE 110 statistics and PDU session statistics. UE 110 statistics may include statistics of UE and PDU sessions handled by the SMF 235, including a number of served UEs 110 (in the CM-CONNECTED state), and the duration the UE 110 is served by the SMF 235. PDU session statistics may include a session duration, a session active time (e.g. having data activity and the session in an active session state (e.g. a Session-ACTIVE state), a session idle time (e.g. no data activity and the session in an idle session state (e.g. a Session-IDLE state)), a number of PDU sessions requests for each DN 140, a number of PDU sessions for a service (e.g. voice, video, etc.), and a number of QoS changes/modifications. The SMF 235 may, as requested, send reports to the NWDA 237 over the Nd7 reference point.

Messaging between the NWDA function 237 and the UE 110 may be sent through the SMF 235 and the AMF 234. For example, in some embodiments, when the NWDA function 237 wants to send a measurement request to many UEs, the NWDA 237 may send one measurement request message to the SMF 235. The SMF 235 may generate a message containing the one measurement request message and send the generated message to the AMF 234 over the N11 reference point. The AMF 234 may generate a NAS message carrying the one measurement request message and send to multiple (R)AN nodes 220 via the N2 reference point. Each of the (R)AN nodes 220 may send the NAS message using a multicast or broadcast channel to a number of UEs. Alternatively, the AMF 234 may send multiple NAS messages, to each UE currently registered with the network, via the N1 reference point and/or via the (R)AN node 220.

The UE 110 may send QoS and/or QoE reports to the AF 250 through signaling messages of the AF 250 application layer sent over the user plane or control plane. The QoS and/or QoE reports may include the geographical location of the UE 110. The QoS parameters may include packet loss rate, packet delay, and other parameters. The QoE parameters may be defined by specific applications. For example, video streaming services may define an initial video buffering time, a total interruption time (total buffering time), and a total number of interruptions. The AF 250 may convert the QoE parameters into a single scalar QoE level (for example, from 1 to 5).

The AF 250 may send reports for QoS and/or QoE to the NWDA 237 via the Nd8 reference point. The requests may be for certain services (for example, video streaming, real-time video and voice conferencing), user information (e.g. described by a user identifier), time periods, geographical areas, and combinations thereof.

Alternatively, another implementation of the Nd4 reference point can use a combination of UP functions and CP functions. For example, the UE 110 may send the messages for example the QoS and/or QoE reports to an application server in the DN 140 by using a data radio bearer of the (R)AN 120, N3 and possibly N9 reference point, and N6 reference point. The application server in the DN 140 may store the reported information from the UE 110. The AF 250 may access the reported information and forward the reported information to the NWDA function 237 by using the Nd8 reference point. In some embodiments, the Nd8 reference point could be implemented by a direct logical link between the AF 250 and the NWDA function 237, for example by using a service based interface. Alternatively, the Nd8 reference point may be implemented by using an intermediate function NEF (Network Exposure Function), which is part of 5G core network (CN) and not shown in FIG. 2. The messages sent between the NWDA function 237 and the AF 250 may be sent via the NEF.

The NWDA 237 may collect network measurement reports and store them in the UDSF 260. The NWDA 237 may request stored data from the UDSF 260 using search criteria (e.g., a time of day, geographical locations and areas, (R)AN node(s) 220, UPF 231, AMF 234, SMF 235) via the N18 interface. The UDSF 260 may provide responses to NWDA 237 requests via the N18 interface.

The UDSF 260 may be used to store data provided by other entities. Other network storage functions, such as a Unified Data Repository (UDR) may be used to store network reported data. The NWDA function 237 may access the UDR function directly or indirectly via the UDM function 233.

The NWDA 237 may send a recommendation for QoS parameters to the PCF 236 via the N23 interface. The QoS parameters may include a GBR rate, a MBR rate, an AMBR rate, different geographical locations, the (R)AN node 220, a time of the day, and a type of PDU flow (e.g. real-time video, real-time voice, video streaming, web browsing, etc.). The NWDA 237 may also send a recommendation regarding traffic splitting policy for types of PDU sessions served by a specific (R)AN node 220 and UPF 231 (e.g. a policy that sets out which type of data flows go to which type of radio access networks).

The PCF 236, based on the recommendation for QoS parameters received from the NWDAF 237, may provide some network information, to other network entities such as some UEs 110. The network information may include QoS information, and/or traffic load information. For example, the QoS information may include the MBR at different times of the day, or at different locations surrounding the current UE location. The traffic load may indicate how busy the (R)AN 120 is. For example, the average percentage of occupied radio resources. Some application software in the UE 110, such as web browser, video player, social network, may use the QoS information to schedule their activities. For example, video player software may download (pre-fetch) more video segments, a web browser may download (pre-fetch) more web pages in advance, a social network application may download (pre-fetch) social network data. A person skilled in the art should understand that the PCF 236 may send the network information to the UE 110 via the AMF 234, where the N1 interface for NAS signaling is terminated. The AMF 234 then forwards the network information received from the PCF 236 to the UE 110. Alternatively, the NWDA function 237 may send the network load information to the AMF 234 via the Nd6 reference point, and then the AMF may forward the network information to some selected UE 110 via the N1 reference point. Yet alternatively, the NWDA function 237 may send the network load information to the SMF 235 via the Nd7 reference point, the SMF 235 may then send the network information to some selected UE 110 via the N11 reference point, the AMF 234, and the N1 reference point.

The NWDA function 237 may send a recommendation regarding traffic splitting policy types of PDU sessions served by a specific (R)AN 120 node and UPF 231 to the PCF 236 via the N23 interface. After the PCF 236 receives the recommendation via the N23 reference point, the PCF 236 may produce traffic routing policies for the UE 110 and send these policies to the UE 110. Alternatively, the NWDA function 237 may send a recommendation regarding traffic splitting policy types of PDU sessions served by a specific (R)AN 120 node and UPF 231 to the SMF 235 via the Nd7 reference point. After receiving the recommendation, the SMF 235 may subsequently use traffic splitting policy recommendation to select a UPF 231 to serve as PDU session anchor UPF, or as uplink classifier, or as branching point. The traffic splitting recommendation could be, e.g. the QoS flows for a specific video streaming service to be routed to some UPFs during at specific times of the day (e.g. 10:00 to 11:30 AM), at specific days of the week (e.g. Monday, Friday).

The PCF 236 may send requests to the NWDA 237 via the N23 interface. One type of request may be to provide recommended QoS parameters, including a GBR rate, a MBR rate, an AMBR rate, for a PDU session type (e.g., real-time video conferencing, streaming video, real-time voice communications, etc.). This type of request may typically relate to the (R)AN node 220, but may also apply to other network components. Another type of request may be to provide recommended mobility management parameters (e.g. a discontinuous reception (DRX) cycle, a paging area, a tracking area, and a timer to deactivate a PDU session having no data activity). This type of request may typically relate to the UE 110, but may also apply to other network components. Another type of request may be to provide a UPF 231 selection policy recommendation. This type of request may typically relate to the UPF 231, but may also apply to other network components. Another type of request may be to provide traffic splitting (also known as offloading). For example, the request may be to provide which flows (e.g. video, voice, content providers, etc.) are to be served by which RATs (e.g., 5G RAN or WiFi access points) at certain times of the day, and in certain geographical areas.

The NWDA 237 may provide the recommended QoS or mobility management parameters using service-based interface commands. The PCF 236 may send a request to the NWDA 237 to provide recommended QoS or mobility management parameters. In some embodiments, the PCF 236 may send a request to subscribe to a notification service of the NWDA function 237. The NWDA function 237 is configured to analyze the information received from other network entities, compute a new value of a QoS or mobility management parameter, and send the new value of the QoS or mobility management parameter to a CN function that subscribes to get the notification.

It is understood that the service-based interfaces are used in the 5G wireless networks. Therefore, the services provided by the NWDA function 237 to the PCF 236 may also be provided to other network functions such as the SMF 235 or the AMF 234. For example, the SMF 235 may request the NWDA function 237 to provide UPF selection policy recommendations for individual services, such as video service, video streaming, and social data networks. The UPF selection policy recommendation may have different formats, such as in the format of ordered list of UPF 231, where the more suitable UPFs are places in the higher position of the ordered list. The UPF selection policy recommendation may be in a format of a cost vector or weight vector, where the more likely selected UPF has lower connection cost. The cost vector may include the cost to use the UPF, the cost of connection links between the UPF and (R)AN nodes, between the UPF and other UPFs, between the UPF and DNAIs, between the UPF and DNs, for both UP and DL directions. In another example, the AMF 234 may request the NWDA 237 to provide the mobility information of UEs 110 via service based interfaces through reference point Nd6. Such mobility information may include mobility pattern of UEs.

There could be multiple logical links between two network functions. For example a (R)AN node could be connected to a UPF by two logical links, the first logical link is provided by a millimetre wave radio network, the second logical link is provided by an optical fibre network. The UPF selection recommendation may include the ordered list, or the cost vector, or weight vector of logical connections at different times of the days, different days of the week, for different applications (e.g. video streaming, URLLC applications, V2X applications, which could be represented by Application ID).

Figure 3:
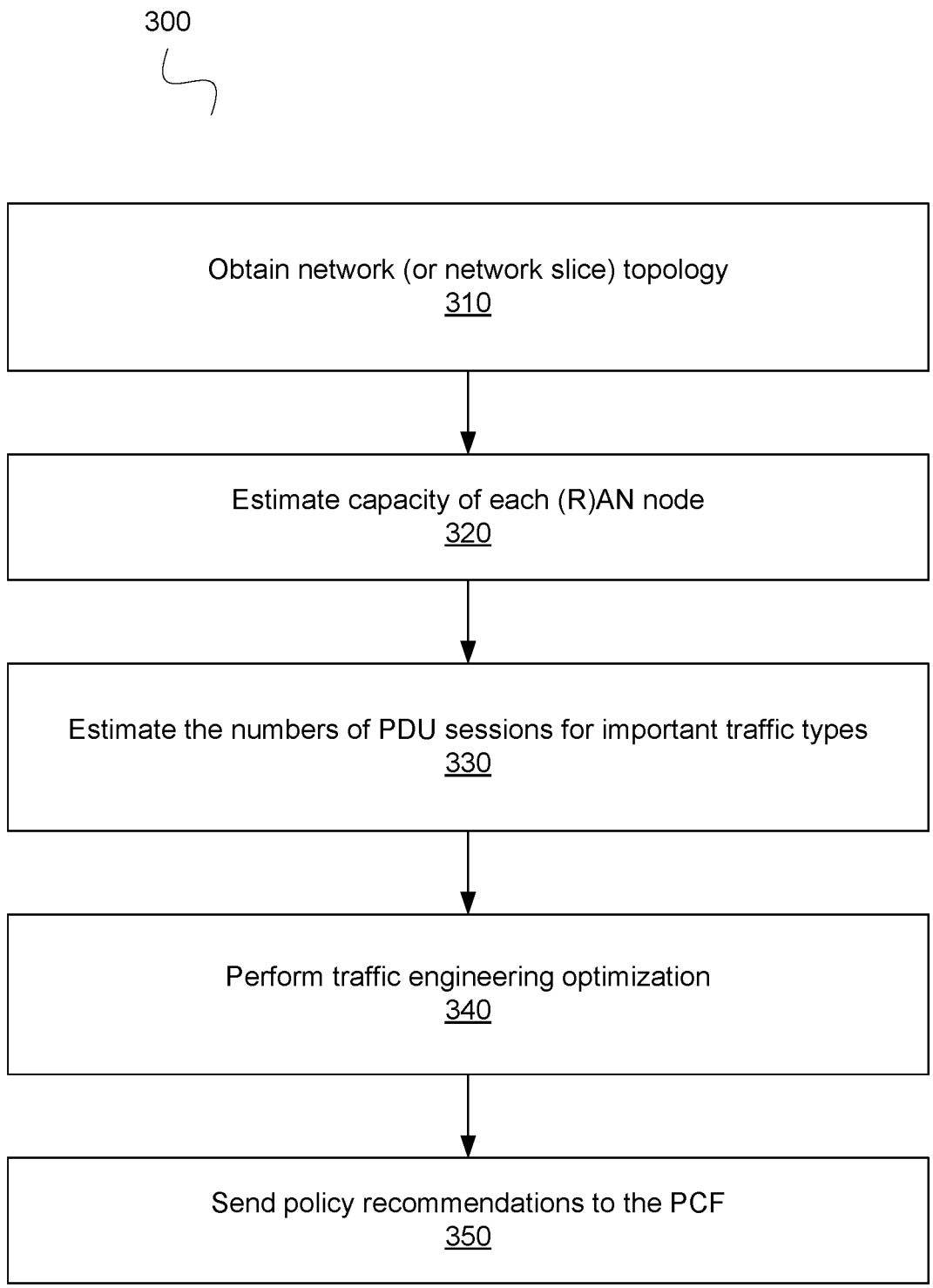
FIG. 3 illustrates, in a flowchart, a method of generating a policy recommendation for traffic routing and QoS policies, in accordance with embodiments of the present invention.

FIG. 3 illustrates, in a flowchart, a method 300 of generating a policy recommendation for traffic routing and QoS policies, in accordance with embodiments of the present invention. The method 300 may be performed by the NWDA 237 to identify efficient and fair traffic routes between network nodes ((R)AN nodes 220, CN 130 nodes (such as UPF 231)) and the data rate (e.g. GBR, MBR, AMBR) allocation for different type of services and applications. The NWDA 237 may be configured to obtain a network (or network slice) topology at 310. The NWDA 237 may obtain the network topology at 310 by receiving the topology, or by using known techniques, together with network or slice configuration information sent from the NMF 270, to build the network topology. The network topology may include network nodes (such as (R)AN nodes 220 and CN 130 nodes (such as UPF 231)), and links (physical or logical links) connecting the network nodes.

Next, the NWDA 237 may estimate the statistics of network capacity (e.g. throughput; including an average and a variance (e.g. minimum value and maximum value) of the aggregated data rate that could go through a (R)AN node for all types of QoS flows, and/or for specific types of QoS flows, at different times of the day, at different days of the week) of the (R)AN nodes 220 by analyzing the traffic measurement reports received from the (R)AN nodes 220. The capacity of CN 130 nodes and ports (such as UPF 231) may be provided to the NWDA 237 by the NMF 270 via the reference point Nd1.

Congestion may occur at (R)AN nodes 220 and UP nodes. Since the processing capacity of UP functions are known, it is easier to avoid congestion at UP functions. The capacity of (R)AN nodes 220 is more difficult to estimate due to varying factors, such as UE 110 locations, connection path loss, scattering of radio propagation environment, and UE 110 capability (e.g. antenna configuration, supported carriers, etc.). The throughput of a (R)AN node 220 may be estimated when it is deployed in a real environment. Thus, the collected reports for throughput statistics of (R)AN nodes 220 are used in the estimation of the throughput of the (R)AN nodes 220.

The measurement reports for individual UEs 110 or a (R)AN node 220 may be sent from (R)AN nodes 220 to the NWDA 237 via the reference points Nd4 and Nd3. When a congestion event is reported to the NWDA 237, the (R)AN node 220 may fully utilize its assigned spectrum. The total throughput, i.e. the total data rate of all QoS flows of PDU sessions, running to this congested (R)AN node 220 may be computed by recording the rate measurements of all current PDU sessions. The (R)AN node 220 and the UPF 231 may also measure the data rate of PDU sessions.

Based on the average and variance of throughput of (R)AN nodes 220, the average and variance of a number of traffic flows and PDU sessions at certain times of the day (e.g., 3 pm, 4 pm, etc.), and the obtained network topology, the NWDA 237 may run a traffic engineering optimization process to find the best UP path selection and averaged bit rate of traffic flows and PDU sessions (e.g. any of the GBR, MBR, AMBR) at a certain time of the day, taking into account capacity reserved for other traffic. The averaged bit rate calculated by the traffic engineering optimization process may be used as a QoS recommendation for traffic flows. The "best path" (e.g. optimal path) calculated by the traffic engineering process may be sent to the PCF 236, and the SMF 235 may obtain the recommended UP path from the PCF 236 during a session establishment or when reselecting a UPF 231. The actual QoS parameters (e.g. any of GBR, MBR, AMBR or other such QoS parameters) and UP paths of sessions may be subsequently updated dynamically by the SMF 235. Since the service-based interface is used for communications among CP functions, the SMF 235 may also obtain the recommended UP paths directly from the NWDA 237 by a subscription/notification method or by a request/response method, for example as described in principle in 3GPP TS 23.501, clause 7.1, and clause 7.2.12, Version 15.0.1 published in December 2017.

Once the statistics of network capacity are estimated at 320, the NWDA 237 may estimate at 330 the number of PDU sessions and traffic flows of "important" traffic (e.g. traffic requiring a high level of QoS and/or QoE), such as real-time video service (e.g., video conferencing), real-time voice (e.g., voice calls), video streaming services, audio streaming services, and ultra reliable and low latency communications (URLLC) data flows, Machine Type Communication (MTC) traffic volume, etc., in each (R)AN node 220 and CN 130 node for different times of the day. The information for this estimation at 330 may be received from the SMF 235. It is also possible that the information may be received from the AMF 234, and/or the (R)AN node 220 and/or the UPF 231.

To determine whether a traffic flow is short-lived or long-lived, the NWDA 237 may rely on a known popularity of a content streaming service such as a video streaming service or an operator video service. Another feature that may be used to determine whether a traffic flow is short-lived or long-lived, includes using a measured threshold, obtained from the measured session time statistics, to classify video sessions as either long-lived or short-lived. For example, the threshold (measured in seconds) may take into account a portion of a number of video flows, which consume the radio resources and network resources.

Identifying traffic types may be desirable for entities such as a mobile network operator (MNO). A MNO may participate in revenue sharing with an over-the-top (OTT) content provider that is willing to share revenue, through the use of an SLA. Traffic (real-time or non-real-time) may be detected from such contracted OTT content providers. Alternatively, the MNO may read the IP header to detect the traffic types. Real-time traffic may be handled by a User Datagram Protocol (UDP), which is indicated in the IP header(s) of the real-time traffic.

Once the number of PDU session are estimated at 330, the NWDA 237 may perform a traffic engineering optimization 340 technique for the network topology created at 310, using the capacity of network nodes estimated at 320, for the numbers of traffic sessions and flows estimated at 330. The QoS or QoE requirements, in terms of data rate, for different types of PDU sessions (or traffic flows) may be used as an optimization criterion. The output of the traffic engineering optimization technique may include, but is not limited to, a traffic routing policy for the UE 110 (e.g., how the UE 110 selects the (R)AN nodes 220 (or different RATs) to send uplink PDUs at certain times)), a traffic routing policy for the SMF 235 (e.g., how the SMF 235 selects the UPF 231 to serve different type of traffic at certain times), a traffic splitting policy for the SMF 235 (e.g., how the SMF 235 selects a UPF 231 and a RAT to forward downlink traffic flows to different RATs (such as 5G RAN, or 4G, or WiFi)), QoS parameters (such as GBR, MBR, AMBR of different traffic types, or data flows at certain times), operation of (R)AN nodes 220 (e.g., turn on or turn off some (R)AN 120 resources (such as transmit or receive antennas, carriers, etc.), or turn on/off all (R)AN nodes 220, operation of transport network layer (e.g., turn on or off some physical links connecting the network nodes), and operation of CN 130 nodes such as UPF 231 (e.g., turn on or turn off some CN 130 nodes).

Based on the output of the traffic engineering optimization technique at 340, the NWDA 237 may provide a policy recommendation 350 to the PCF 236. The policy recommendation may be provided directly to the PCF 236 over the N23 interface, or indirectly via another network entity (for example, via the UDSF 260). Other steps may be added to the method 300. A similar process may be used to send similar recommendations to other network entities, including the NMF 270.

Figure 4:
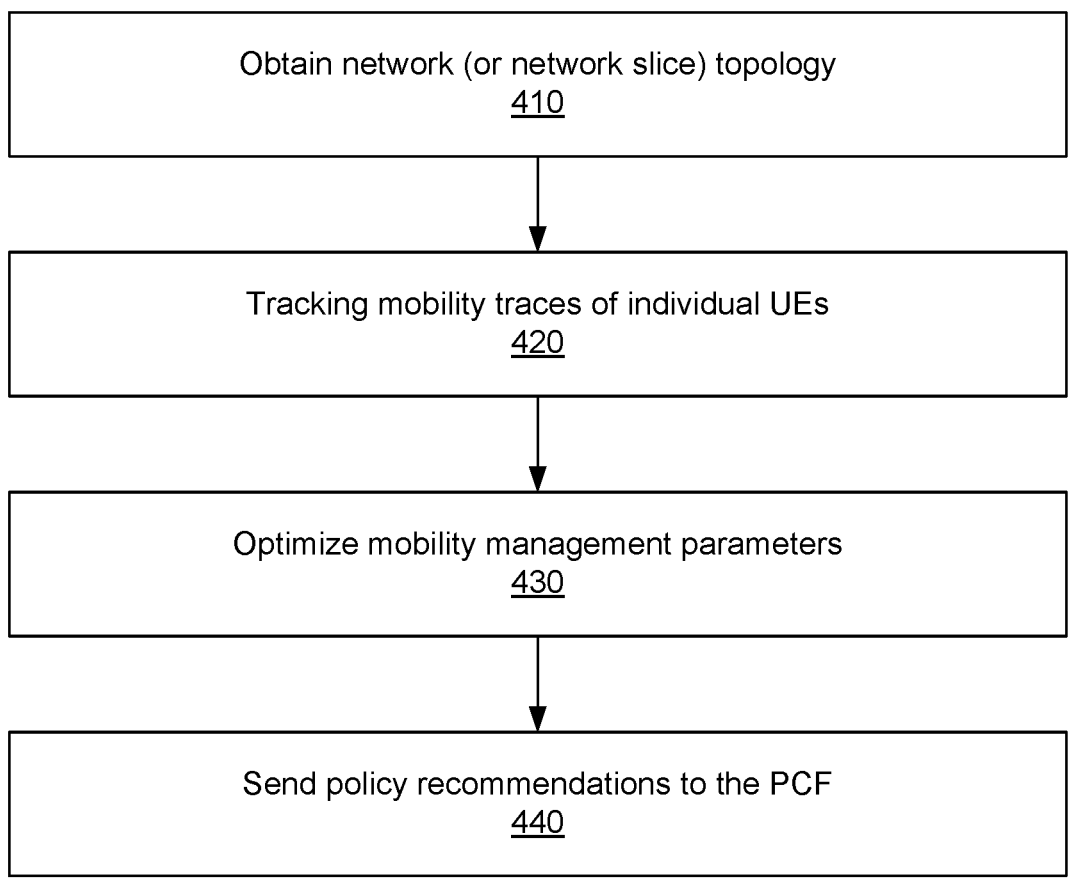
FIG. 4 illustrates, in a flowchart, an example of a method of generating a policy recommendation for mobility management per UE, in accordance with embodiments of the present invention.

FIG. 4 illustrates, in a flowchart, an example of a method 400 of generating a policy recommendation for mobility management (MM) per UE 110, in accordance with embodiments of the present invention. The NWDA 237 may be configured to obtain a network topology at 410. The NWDA 237 may obtain the network topology at 410 by receiving the topology, or by using known techniques, together with network or slice configuration information sent from the NMF 270 via the reference point Nd1, to build the topology. The network topology may include network nodes (such as (R)AN nodes 220 and CN 130 nodes (UPF 231)), and links (physical or logical links) connecting the network nodes.

Once the network topology is obtained at 410, the NWDA 237 may track, at 420, mobility traces of individual UEs 110. The NWDA 237 may request the access and mobility information from the AMF 234, such as a UE's serving cell, handover event information (e.g. time, source cell ID and target cell ID), and UE 110 connection management (CM) state change events (e.g. the times when the UE 110 entered the CM-IDLE state and the times when the UE 110 entered the CM-CONNECTED state). The AMF 234 may send the mobility information to the NWDA 237. The NWDA 237 may store the UE 110 mobility information in the UDSF 260. The UE 110 mobility information may also be included in the QoS and/or QoE reports, together with UE 110 location information.

Based on the access and mobility tracking information per UE 110 obtained at 420, the NWDA 237 may generate, at 430, access and mobility management parameters, including a DRX cycle, a tracking area, a paging area, and a handover threshold. Next, the NWDA 237 may send, at 440, a policy recommendation to the PCF 236 via the reference point N23. Other steps may be added to the method 400.

Because the access and mobility management policy may be used by the AMF 234, a person skilled in the art should understand that the PCF 236 may forward the access and mobility management recommendation to the AMF 234. Alternatively, because the NWDA function 237 may provide services to PCF 236, some other functions such as AMF 234 may use the services provided by NWDA function 237 to obtain the access and mobility management recommendation For example, some other function may subscribe to the access and mobility management recommendation services of the NWDA 237 in order to obtain notification messages of the NWDA function 237. Alternatively, the AMF 234 may send a request message for the access and mobility management recommendation to the NWDA function 237. The NWDA 237 may send a response to the AMF 234 to provide access and mobility management recommendation to the AMF 234.

Figure 5:
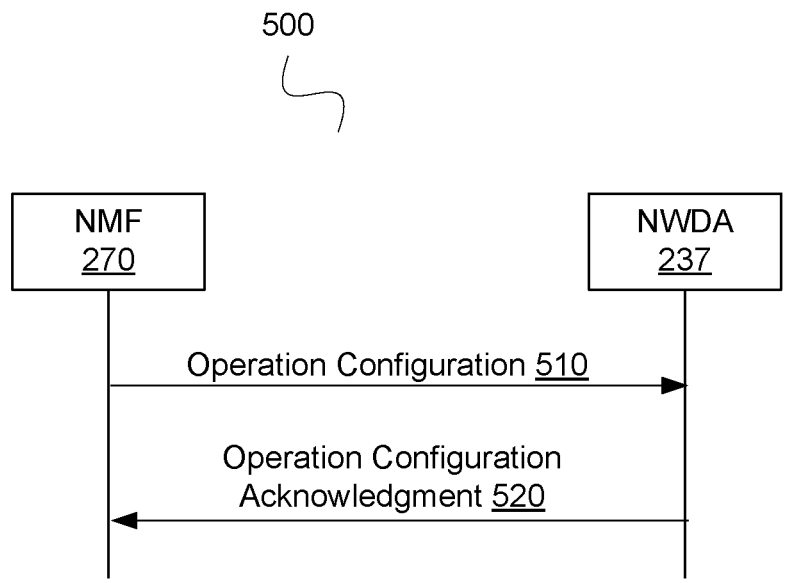
FIG. 5 illustrates, in a message flow diagram, an example of a signaling procedure for NMF to configure a NWDA, in accordance with embodiments of the present invention.

FIG. 5 illustrates, in a message flow diagram, an example of a signaling procedure 500 for NMF 270 to configure a NWDA 237, in accordance with embodiments of the present invention. The signalling procedure 500 may be used for the NMF 270 to send operation configuration instructions to the NWDA 237. The operation configuration instructions may include an address of a database containing measurement data for data analytics. The address of the database could be UDSF ID, UDSF IP Address, UDSF FQDN, or an identifier of another storage function, such as UDR. The NMF 270 may send an operation configuration message at 510 instructions to the NWDA 237 over the Nd1 reference point, as described above. Next, the NWDA 237 may send an operation configuration acknowledgement message at 520 to the NMF 270.

Figure 6:
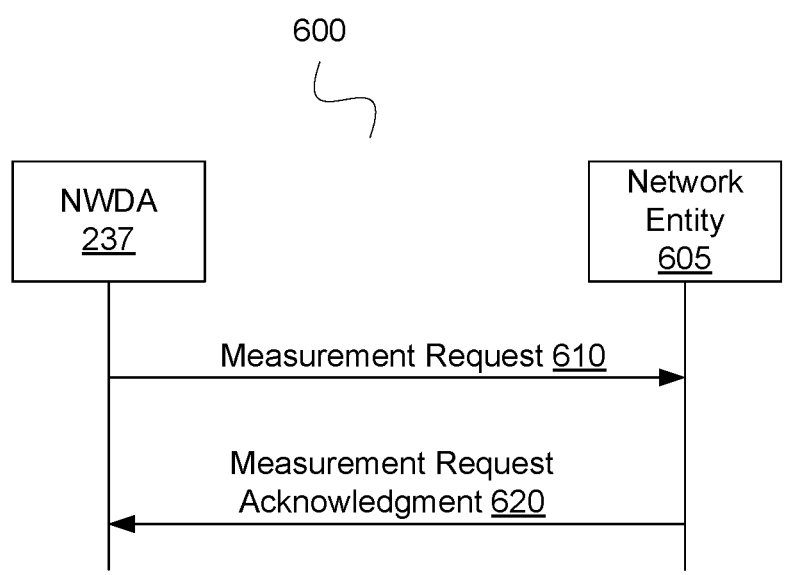
FIG. 6 illustrates, in a message flow diagram, an example of a signaling procedure for a NWDA to send measurement configuration instructions to network entities, in accordance with embodiments of the present invention.

FIG. 6 illustrates, in a message flow diagram, an example of a signaling procedure 600 for a NWDA 237 to send measurement configuration instructions to network entities, in accordance with embodiments of the present invention. The NWDA 237 function may send a measurement request message at 610 to a network entity 605 (e.g., UPF 231, (R)AN node 220, UE 110, AMF 234, SMF 235) over a corresponding reference point, as described above. Next, the network entity 605 may send a measurement request acknowledgement message at 620 to the NWDA 237. It is noted that in this specification the term network entity can include a network function (NF) or a network element, such as a (R)AN node, or a CN network element, or a UE. In some embodiments, the measurement request sent at 610 may include an indication to start the measurement (or measurement start), to pause the measurement (measurement pause), or to stop the measurement (measurement stop), or to modify the measurement configuration. The measurement request sent at 610 may include a transaction ID, such as Network Measurement Data Request Identifier (NMDR ID), which can be used by both NWDA function 237 and Network Entity 605 to refer to the same measurement request later.

Figure 7:
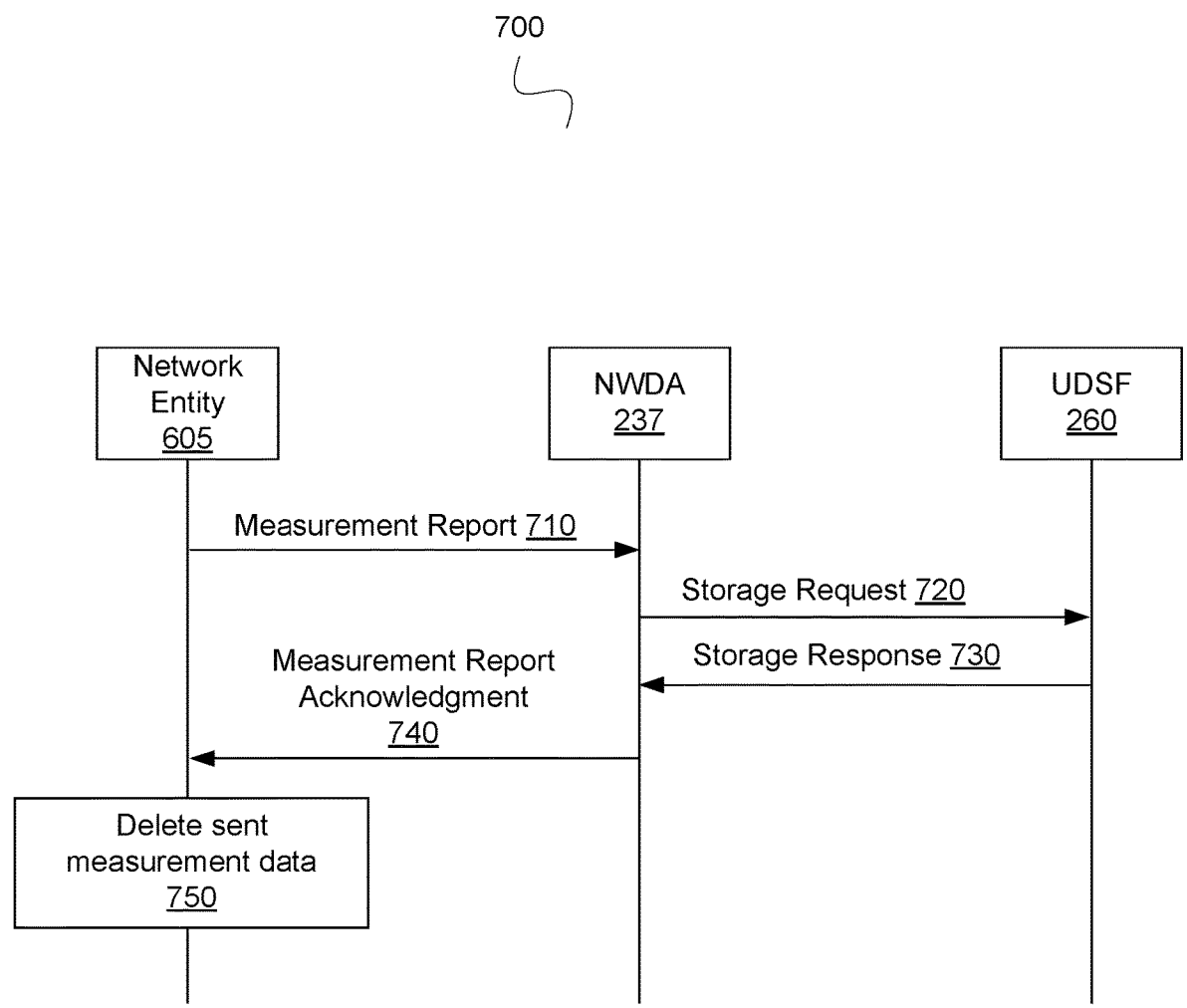
FIG. 7 illustrates, in a message flow diagram, an example of a signaling procedure for network entities to send measurement reports to the NWDA, in accordance with embodiments of the present invention.

FIG. 7 illustrates, in a message flow diagram, an example of a signaling procedure 700 for network entities 605 to send measurement reports to the NWDA 237, in accordance with embodiments of the present invention. A network entity 605 (e.g., UPF 231, (R)AN 120, UE 110, AMF 234, SMF 235) may send a measurement report message at 710 that includes a measurement report to the NWDA 237. Next, the NWDA 237 may extract the measurement report from the measurement report message and send the measurement report to the UDSF 260 in a storage request message at 720. The UDSF 260 may store the measurement report in a repository (such as its database). The UDSF 260 may send a storage response message at 730 to the NWDA 237. Next, the NWDA 237 may send a measurement report acknowledgement at 740 to the network entity 605. The network entity 605 may delete the sent measurement data at 750.

Figure 8:
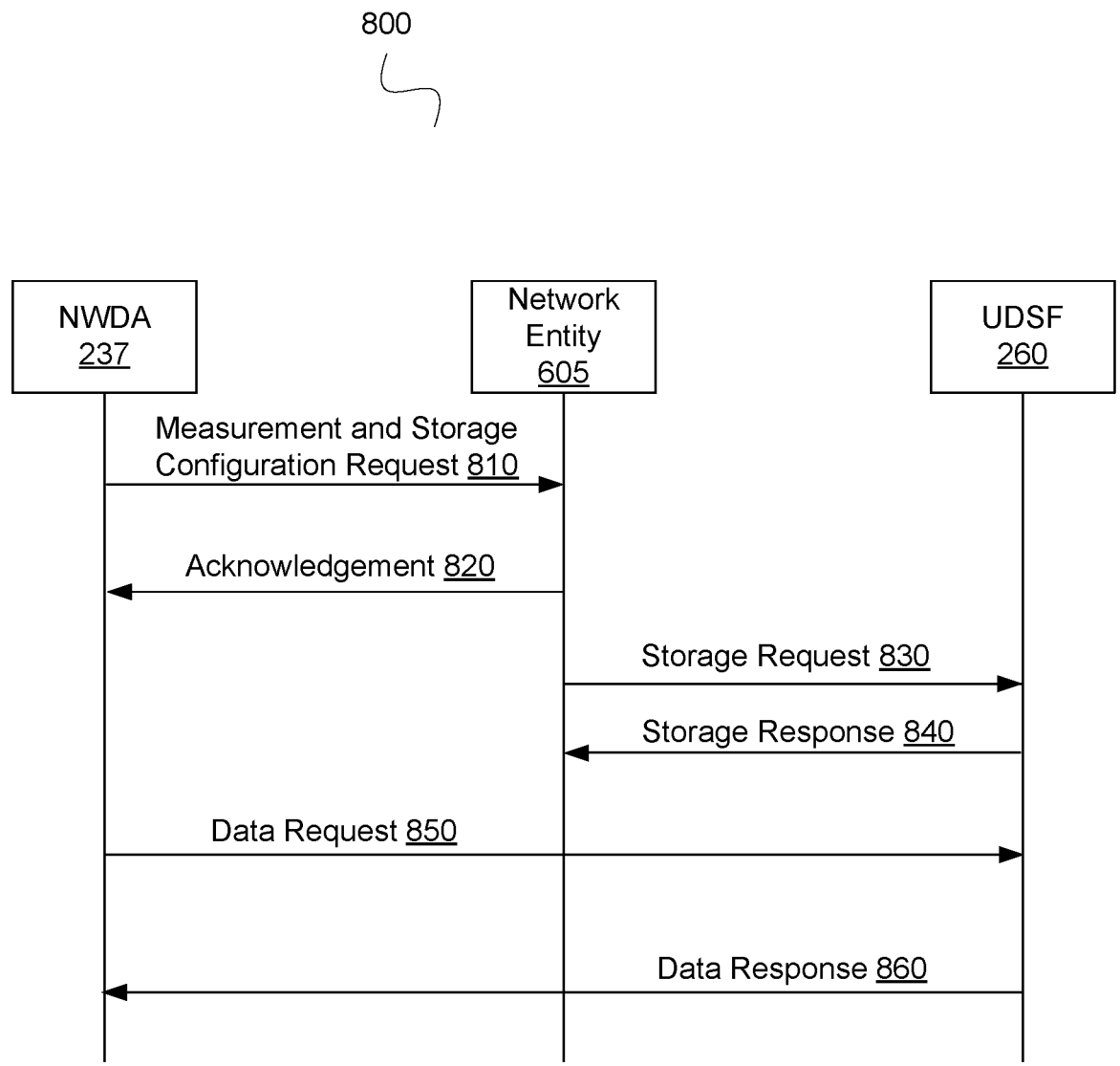
FIG. 8 illustrates, in a message flow diagram, an example of a signaling procedure for storing measurement reports at the UDSF, in accordance with embodiments of the present invention.

Although the transmission of measurement reports may typically be directly between a network entity 605 and the NWDA 237 over their reference point, the NWDA 237 may alternatively (and/or additionally) instruct the network entity 605 to store the measurement reports in the UDSF 260. FIG. 8 illustrates, in a message flow diagram, an example of a signaling procedure 800 for storing measurement reports at the UDSF 260, in accordance with embodiments of the present invention. The NWDA 237 may send a measurement and storage configuration request message at 810 to a network entity 605 (e.g., UPF 231, (R)AN node 220, UE 110, AMF 234, SMF 235) to generate and store a measurement report in the UDSF 260. The measurement and storage configuration request message sent at 810 may include an indication of where to store the report (e.g., the UDSF 260), an indication of how to format the report, an indication of how often to prepare and store the report, etc. Next, the network entity 605 may send an acknowledgement message at 820 to the NWDA 237 in response to receiving the measurement and storage configuration request message at 810. Next, the network entity 605 may send a storage request message at 830 to the UDSF 260. The storage request message 830 may include a request to store the measurement report requested by the NWDA 237 from the network entity 605. Next, the UDSF 260 may send a storage response message at 840 to the network entity 605. Next the NWDA 237 may send a data request message 850 to the UDSF 260. The data request message 850 may be for a network entity 605 measurement report. Next, the UDSF 260 may send a data response message at 860 to the NWDA 237. The data response message sent at 860 may include the requested data (such as a network entity 605 measurement report). In some embodiments, the measurement and storage configuration request message includes instructions as to the preparation of the measurement report. The instructions can include information as to when to send the measurement report, such as send the measurement report a periodically at a certain time of the day, or send the measurement report after an event (such as PDU Session Release, AN Release, UE enters CM-IDLE state, UE enters CM-CONNECTED state, UE enters RRC-INACTIVE state, UE enters MICO mode, UE enters power saving mode). The measurement and storage configuration request message may include an indication to start a measurement (or measurement start), to pause a measurement (measurement pause), or to stop a measurement (measurement stop), or to modify a measurement configuration. The measurement and storage configuration request message may also include a transaction ID, such as a Network Measurement Data Request Identifier (NMDR ID), which can be used by both NWDA function 237 and Network Entity 605 to refer to the same measurement request later.

Figure 9:
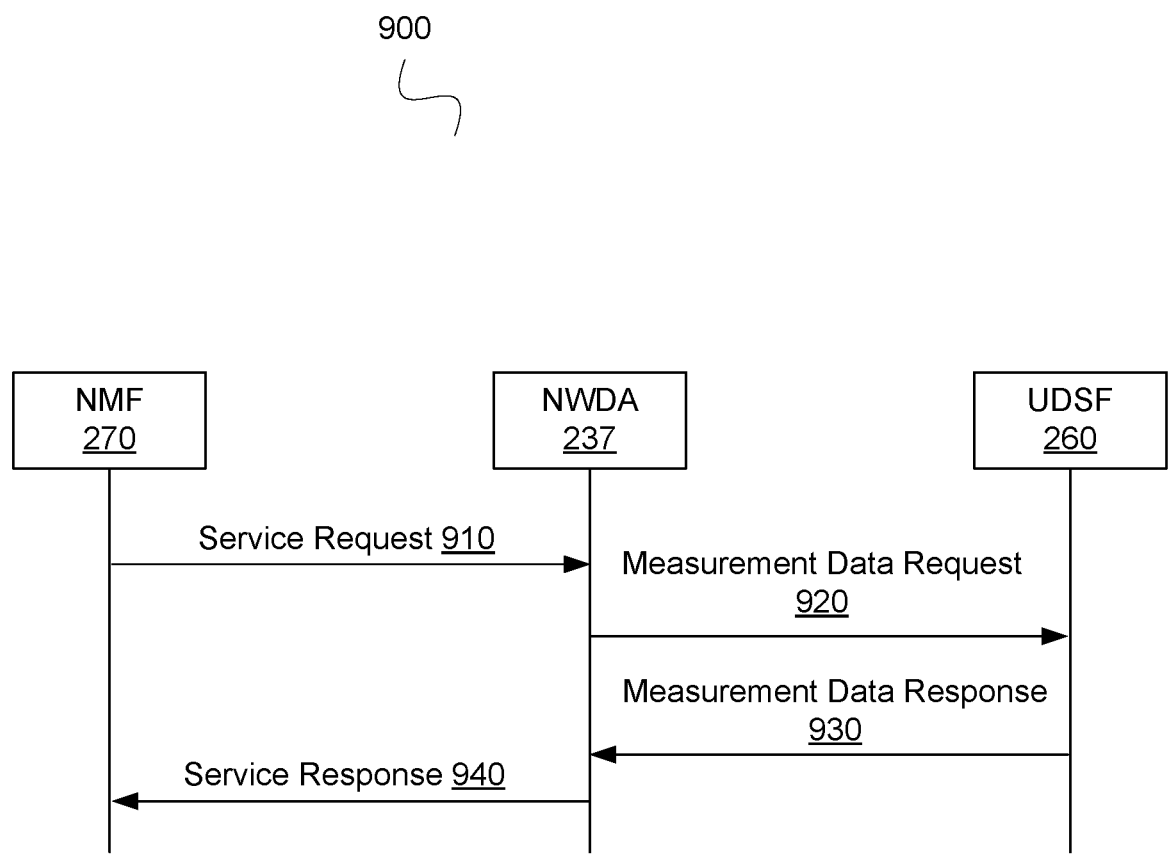
FIG. 9 illustrates, in a message flow diagram, an example of a signaling procedure for the NMF to obtain services from the NWDA, in accordance with embodiments of the present invention.

FIG. 9 illustrates, in a message flow diagram, an example of a signaling procedure 900 for the NMF 270 to obtain services (such as measurement reports) from the NWDA 237, in accordance with embodiments of the present invention. The NMF 270 may send a service request message at 910 to the NWDA 237. The service request message sent at 910 may include a time of the day value, a specific (R)AN node 220, specific CNs 130, specific UEs 110, a specific DN 140, or any combinations thereof. Service request types that may be requested in the server request message include measurement data requests, QoS/QoE parameters estimation requests, network function utilization requests, and transport link utilization requests. The NWDA 237 may create a filter based on the service request message sent at 910 that is received. The NWDA 237 may send a measurement data request message at 920 to the UDSF 260 to get the filtered measurement data. Next, the UDSF 260 may send a measurement data response message at 930, which may include the requested filtered measurement data. If the NMF 270 requests processed data (such as QoS/QoE parameter estimation, network function utilization, etc.) the NWDA 237 may process the filtered measurement data and generate the requested processed data. The NWDA 237 may then send a service response message at 940 to the NMF 270. The service response message sent at 940 may include the requested processed data.

Figure 10:
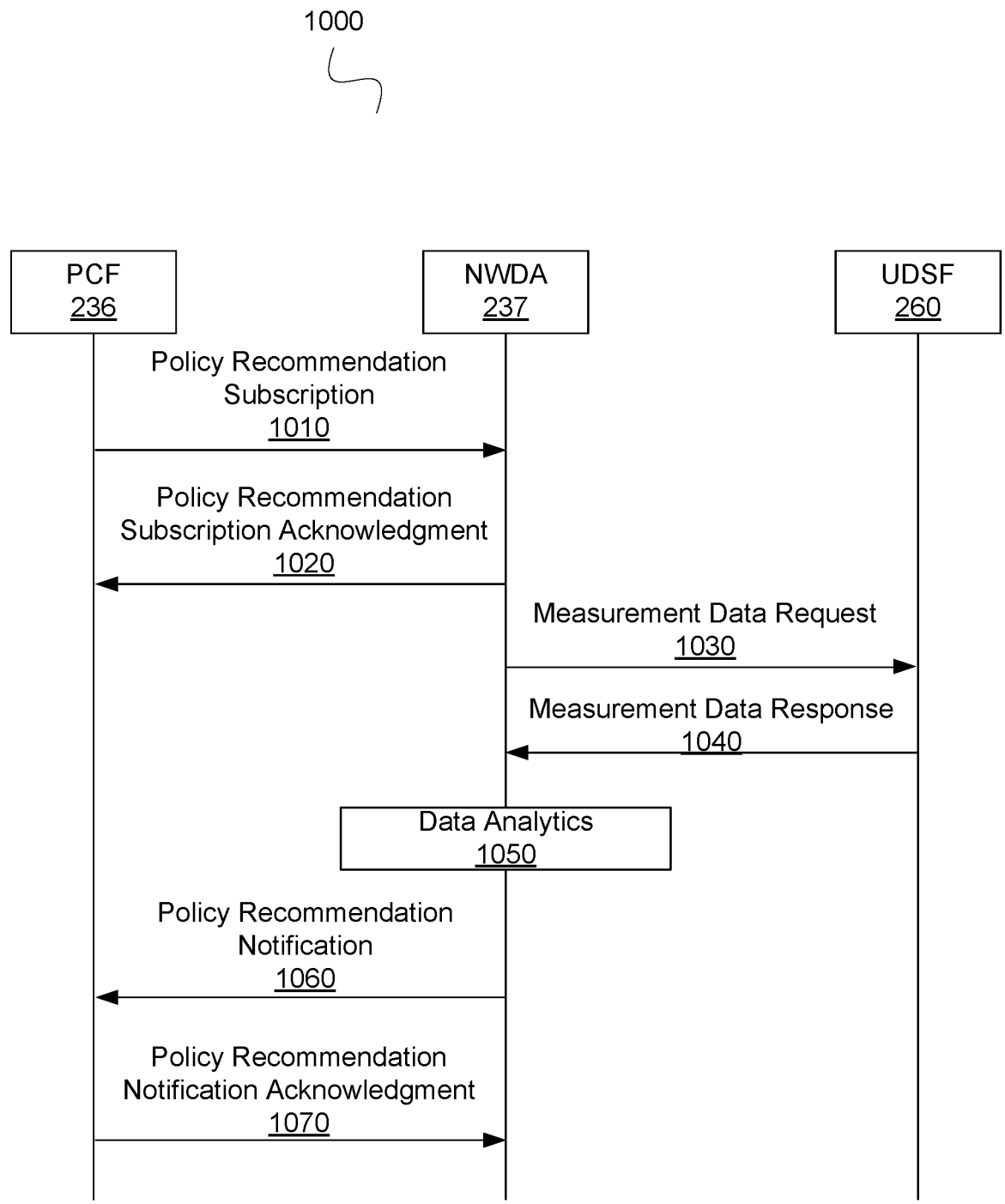
FIG. 10 illustrates, in a message flow diagram, an example of a signaling procedure for the PCF to obtain a policy recommendation, in accordance with embodiments of the present invention.

FIG. 10 illustrates, in a message flow diagram, an example of a signaling procedure 1000 for the PCF 236 to obtain a policy recommendation, in accordance with embodiments of the present invention. The PCF 236 may send a policy recommendation subscription request at 1010 to the NWDA 237. The policy recommendation subscription request may include a type of policy, a time of the day value, geographical locations, and if the policy is for a specific network entity, such as mobility policy for AMF. The policy recommendation subscription request sent at 1010 may include an indication of how often the NWDA 237 may send the policy recommendation to the PCF 236, such as one time only, or periodically at certain time of the day, certain day of the week, or any time when the NWDA 237 decides to send the policy recommendation. Next, the NWDA 237 may send a policy recommendation subscription acknowledgment message at 1020 to the PCF 236. The policy recommendation subscription acknowledgment message sent at 1020 may be implemented by an acknowledgement message in the transport network layer protocol. Next, the NWDA 237 may send a measurement data request message at 1030 to the UDSF 260 to retrieve measurement data. Next, the UDSF 260 may send a measurement data response message at 1040 to the NWDA 237. The measurement data response message sent at 1040 may include measurement data. Next, the NWDA 237 may perform data analytics at 1050 to analyze the measurement data and create a policy recommendation. The NWDA 237 may send to the PCF 236 a policy recommendation notification message at 1060. The policy recommendation notification message sent at 1060 may include the policy recommendation (or in some embodiments, a policy input or a portion of the policy recommendation associated with the analyzed measurement data corresponding to the time of the day and geographical locations. Next, the PCF 236 may send a policy recommendation notification acknowledgement message at 1070 to the NWDA 237. The policy recommendation notification acknowledgement message sent at 1070 may also be implemented by an acknowledgement message in the transport network layer protocol. The NWDA 237 may send a measurement data request message at 1030 and perform data analytics at 1050 periodically and send the policy recommendation notification at 1060 to the PCF periodically.

A type of policy included in the policy recommendation subscription message sent at 1010 may be a QoS policy for a specific service, such as video streaming service. The QoS policy may include the QoS parameters such as Maximum Bit Rate, Maximum Flow Bit Rate and Maximum Guaranteed Bit Rate of GBR session, Maximum bit rate of non GBR flows of a PDU session, ARP of traffic flows. Another type of policy included in the policy recommendation subscription message sent at 1010 may be uplink or downlink traffic routing, where a RAT could be selected for some traffic types such as video streaming, web browsing, IoT, URLLC.

The time of the day included in the policy recommendation subscription message sent at 1010 may be a start time and an end time, for example start time is 9:00 am, the end time is 10:00. Alternatively, the time of the day included in the policy recommendation subscription message sent at 1010 may be a start time and the duration after the start time, for example the start time is 9:00 am, the duration is 1 hour after the start time.

The geographical locations included in the policy recommendation subscription message sent at 1010 may be (R)AN addresses (e.g. IP addresses or (R)AN ID of (R)AN nodes), or a registration area (which may include a set of (R)AN nodes), or geographical zone IDs.

While the PCF 236 in FIG. 10 sends a policy recommendation subscription request for a notification service of the NWDA 237, as the service-based interface is used in the 5G wireless networks, some other CP functions such as the AMF 234 or SMF 235 may also use the same services provided by the NWDA function 237, such as the subscription service. The SMF 235 may similarly send to NWDA 237 a policy recommendation subscription message. The policy recommendation message sent by the SMF 235 may include UPF selection policy for some specific types of traffic flows, such as video streaming services, URLLC, IoT. The policy recommendation subscription massage sent by the SMF 235 may also include geographical locations. The geographic location may be represented by the addresses of the UPF (such as IP addresses), or the DNAI (Data Network Access Identifier). The policy recommendation included in the policy recommendation notification message sent at 1060 by the NWDA 237 may be a UPF selection policy recommendation. In some embodiments, UPF selection policy recommendation may be represented by an ordered list of UPFs, in which the first UPF in the list of ordered UPFs is the most likely selected UPF. In some embodiments, the UPF selection policy recommendation may be a list of mapping entries. Each mapping entry in the list of mapping entries may be the UPF address and a cost metric. A cost metric may represent a probability that a UPF could be selected for a traffic QoS flow at a certain time of the day. The higher the cost, the lower the probability.

The AMF 234 may also send a policy recommendation subscription request to the NWDA function 237. As with the policy recommendation subscription request sent at 1010, the policy subscription message sent by the AMF 232 may include a type of policy. The type of policy may be for one UE, or group of UE, or any UE that may access to a network slice instance. A type of policy for one UE may include the UE ID (e.g. SUPI, GPSI). A type of policy for a group of UEs may include an Internal Group Identifier. The NWDA 237 may access the UDM 233 to obtain the UE subscription information. The policy recommendation could be a DRX cycle for a UE group, such as group of IoT devices.

Figure 11:
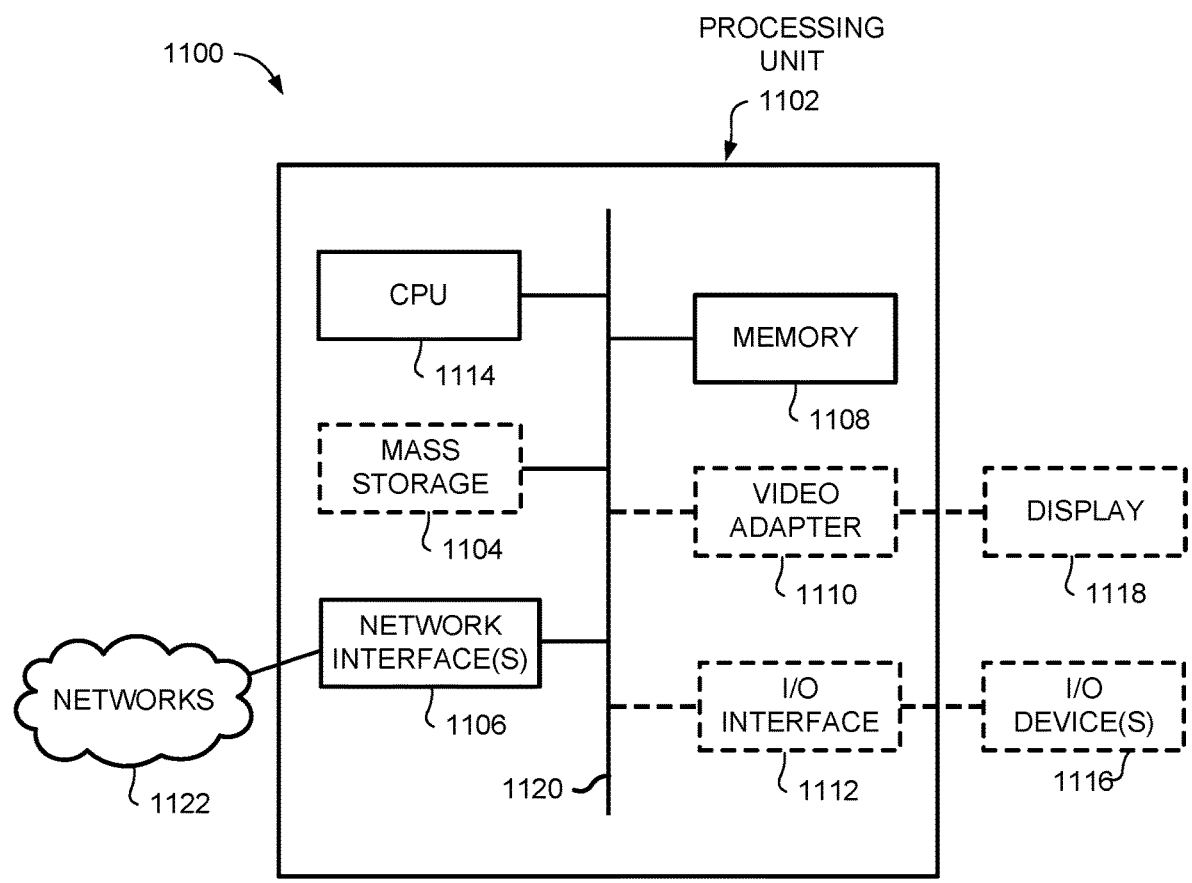
FIG. 11 illustrates, in a block diagram, a computing system that may be used for implementing the devices and methods disclosed herein.

FIG. 11 illustrates, in a block diagram, a computing system 1100 that may be used for implementing some of the devices and methods disclosed herein. Specific devices may utilize all of the components shown or only a subset of the components, and levels of integration may vary from device to device. Not all illustrated elements may be present in all embodiments, as will be appreciated by those skilled in the art. Furthermore, a device may contain multiple instances of a component, such as multiple processing units, processors, memories, transmitters, receivers, etc. The computing system 1100 includes a processing unit 1102. The processing unit 1102 includes a central processing unit (CPU) 1114, memory 1108, one or more network interfaces 1106, and may optionally further include a mass storage device 1104, a video adapter 1110, and an I/O interface 1112 connected to a bus 1120.

The bus 1120 may be one or more of any type of several bus architectures including a memory bus or memory controller, a peripheral bus, or a video bus. The CPU 1114 may comprise any type of electronic data processor. The memory 1108 may comprise any type of non-transitory system memory such as static random access memory (SRAM), dynamic random access memory (DRAM), synchronous DRAM (SDRAM), read-only memory (ROM), or a combination thereof. The memory 1108 may include ROM for use at boot-up, and DRAM for program and data storage for use while executing programs.

The one or more network interfaces 1106 may comprise wired links, such as an Ethernet cable, and/or wireless links to access nodes or different networks. The network interfaces 1106 allow the processing unit 1102 to communicate with remote units via the networks. For example, the network interfaces 1106 may provide wireless communication via one or more transmitters/transmit antennas and one or more receivers/receive antennas. The processing unit 1102 may be coupled to a network 1122 (e.g. a local-area network or a wide-area network) for data processing and communications with remote devices, such as other processing units, the Internet, or remote storage facilities.

The mass storage 1104 may comprise any type of non-transitory storage device configured to store data, programs, and other information and to make the data, programs, and other information accessible via the bus 1120. The mass storage 1104 may comprise, for example, one or more of a solid state drive, hard disk drive, a magnetic disk drive, or an optical disk drive.

The video adapter 1110 and the I/O interface 1112 provide interfaces to couple external input and output devices to the processing unit 1102. As illustrated, examples of input and output devices include a display 1118 coupled to the video adapter 1110 and one or more I/O devices 1116 (e.g. mouse/keyboard/printer) coupled to the I/O interface 1112. Other devices may be coupled to the processing unit 1102, and additional or fewer interface cards may be utilized. For example, a serial interface such as universal serial bus (USB) (not shown) may be used to provide an interface for an external device.

FIG. 12-A, FIG. 12-B and FIG. 12-C illustrate, in message flow diagrams, an example of a signaling procedure 1200 for an NF function 1220 to request data analytics from the NWDA function 237, in accordance with embodiments of the present invention. NF 1220 is a generic network function, used to illustrate the general procedure. More details are discussed below for different types of NF. For example, the NF 1220 can be AMF 234

As illustrated in FIG. 12-A and FIG. 12-B, an NF 1220 may send a Network Information Request message 1201a to the NWDA 237. The Network Information Request message 1201a may include an indication of how often the NWDA function 237 may send a policy recommendation to the NF 1220, such as one time only, or periodically at certain time of the day, certain day of the week, or any time when the NWDA 2 function 37 decides to send the policy recommendation because of significant changes in the network detected by the NWDA function 237. The Network Information Request message 1201a sent from the NF 1220 to the NWDA function 237 may include filter information, which may be used to indicate specific Network Information at certain time (e.g. times of days, days of the week, weekdays or weekend), certain locations (e.g. (R)AN addresses, Registration Areas, Paging Areas, LADN Service Area, Service Areas of NF like AMF, SMF, UPF, or whole PLMN), certain UEs (e.g. list of UE IDs), certain UE groups (e.g. Internal Group ID(s)), certain application (e.g. represented by Application Identifiers), certain network slice (e.g. represented by S-NSSAI, NSI ID), certain PLMN, certain network function(s) (e.g. Identifier of CP functions like AMF, SMF, UPF, PCF), certain access network (5G RAN, 4G RAN, WiFi, 3GPP Access, non-3GPP Access, wireline access). The Network Information Request 1201a message sent from the NF 1220 to the NWDA function 237 may also include an indication of how often the NWDA function 237 may send filter information to the NF 1220, such as one time only, or periodically at certain time of the day, certain day of the week, or at any time when the NWDA function 237 decides to send a policy recommendation In some embodiments, the NF 1220 is the AMF 234 and the AMF 234 may send the Network Information Request message 1201a to the NWDA function 237 for information related to access and mobility management. For example the request 1201 message may include the network slice information (e.g. S-NSSAI, NSI ID), the UE information such as UE IDs (e.g. SUPI, or GPSI), Internal Group ID (representing a group of UEs), the connection state that UE stays in (e.g. RRC-INACTIVE, or CM-IDLE, or CM-CONNECTED, or MICO mode. The information related to access and mobility management returned by the NWDA 237 in message 1214 after the data analytics step 1213 may include statistics (e.g. minimum value, maximum value, average value) of configuration parameters, for example the minimum duration, maximum duration, average duration that UEs accessing a Network Slice stay in RRC-INACTIVE state, or stay in CM-IDLE state, or stay in CM-CONNECTED state). Further, the request message may include the UE ID(s), the start time (e.g. 9:00 AM) and end time (e.g. 17:00 PM) of the day, the day(s) of the weekday (e.g. Monday, Tuesday). In which case the information related to access and mobility management returned by the NWDA 237 in message 1214 after the data analytics step 1213 can include the mobility pattern (or mobility trajectory) of specific UEs. In some embodiments, The request message 1201a may include the UE ID(s), the start time (e.g. 9:00 AM) and end time (e.g. 17:00 PM) of the day, the day(s) of the weekday (e.g. Monday, Tuesday), and optionally the RAT type. In which case the information related to access and mobility management returned by the NWDA 237 in message 1214 after the data analytics step 1213 can include the "Expected UE activity behavior" as specified in TS 23.501, version 2.0.1, published in December 2017, i.e. the expected pattern of the UE's changes between CM-CONNECTED and CM-IDLE states. In some embodiments, the request message may include the UE ID(s), the start time (e.g. 9:00 AM) and end time (e.g. 17:00 PM) of the day, the day(s) of the weekday (e.g. Monday, Tuesday), optionally the RAT type. In which case the information related to access and mobility management returned by the NWDA 237 in message 1214 after the data analytics step 1213 can include the "Expected HO behavior" as specified in TS 23.501, version 2.0.1, published in December 2017, i.e. the expected interval between inter-RAN handovers. In some embodiments, the request message may include the (R)AN node address (e.g., IP address, (R)AN node ID, FQDN), of any (R)AN nodes in the service area of the AMF, the start time (e.g. 9:00 AM) and end time (e.g. 17:00 PM) of the day, the day(s) of the weekday (e.g. Monday, Tuesday), and load information request (minimum load, maximum load, average load (e.g. percentage of resource usage)). PM) of the day, the day(s) of the weekday (e.g. Monday, Tuesday), optionally the RAT type. In which case the information related to access and mobility management returned by the NWDA 237 in message 1214 after the data analytics step 1213 can include load information of specific (R)AN nodes. In some other embodiments, the NF 1220 is the SMF 235 and the SMF 235 may send the Network Information Request message 1201a. The send the Network Information Request message 1201a may include a request (or subscribe) for statistical information, which may include:

- minimum duration, maximum duration, or average duration of active connection time of PDU Session type that one or more specific UE(s), or UEs of a group (e.g. the UEs of Internal Group, the UEs that can access specific network slice);
- traffic load of UPF at certain time of the day, certain day of the week;
- list of ordered UPFs (or list of preferred UPF) to provide a UP connection from a (R)AN node to a DN at certain time of the day, certain day of the week. The first UPF in the list is the most suitable UPF to provide UP connection;
- list of ordered UPFs (or list of preferred UPF) to provide UP connection from a (R)AN node to DN for a certain type of application(s), such as video streaming, at certain time of the day, certain day of the week. The first UPF in the list is the most suitable UPF to provide UP connection; and
- weighing coefficient (or cost value) associated with a UPF when the SMF needs to select a UPF. The Weight Coefficient may be provided as a function of at least one or any combinations of following parameters:
  - UE Location (could be represented by (R)AN address (such as (R)AN ID, (R)AN IP Address, (R)AN FQDN)),
  - Time of the day (e.g. 9:00 am to 10:00 am),
  - Day of the week (e.g. weekday, weekend),
  - Network slice information (e.g. S-NSSAI),
  - Access technology being used by the UE,
  - PDU Session Type (e.g. IPv4, IPv6, Ethernet Type, Unstructured Type),
  - DNN, and
  - DNAI
- list of ordered logical links (or list of preferred logical connections) to connect two network function, such as two UPFs or a (R)AN node and a UPF, to provide UP connection from a (R)AN node to DN for a certain type of application(s), such as video streaming, at certain time of the day, certain day of the week. The first UPF in the list is the most suitable UPF to provide UP connection; and
- weighing coefficient (or cost value) associated with a logical connection between network function, such as two UPFs, or between a (R)AN and a UPF, when the SMF needs to select a UPF. The Weight Coefficient of a logical link may be provided as a function of at least one or any combinations of following parameters:
  - UE Location (could be represented by (R)AN address (such as (R)AN ID, (R)AN IP Address, (R)AN FQDN)),
  - Time of the day (e.g. 9:00 am to 10:00 am),
  - Day of the week (e.g. weekday, weekend),
  - Network slice information (e.g. S-NSSAI),
  - Access technology being used by the UE,
  - PDU Session Type (e.g. IPv4, IPv6, Ethernet Type, Unstructured Type),
  - DNN, and
  - DNAI.

In yet some other embodiments, the NF 1220 is the PCF 236 and the PCF 236 sends the Network Information Request message 1201a. The Network Information Request message 1201a may include a request (or subscribe) for the NWDA 237 to return policy information in message 1214 after the data analytics step 1213. One or more categories of policy information can be requested. For example, UE Route Selection Policy (URSP) can be requested. This can be for UEs belonging to a UE Group (e.g. Internal Group ID, IMSI-Group ID), for UEs that connect to a Network Slice (e.g. represented by S-NSSAI), for UEs that connect to a DNN, or for UEs that connect to a Access Type (for example 3GPP 5G, 4G, non-3GPP (WiFi)). Further, QoS policies (QoS Profiles for (R)AN nodes, QoS Rules for UEs, QoS policies for UPFs) can be requested. The QoS policies can be for particular UEs (represented by UE ID such as SUPI, GPSI); particular UE Groups (represented by Internal Group ID, IMSI-Group ID); for time of the day (e.g. from 8:00 am to 9:00 am), for days of the week (e.g. weekdays or weekend, or specific weekdays like Monday, Friday); for specific (R)AN locations (represented by, e.g. (R)AN ID, (R)AN IP Address, (R)AN FQDN, Tracking Area(s), Registration Area(s)); for specific UPF(s) (represented by UPF ID(s), or UPF IP Address(es)), for specific Geographical Zone IDs; or for specific network slice(s) (represented by e.g. S-NSSAI, or NSI-ID). Another category of policies includes Multi-access traffic steering, switching and splitting (ATSSS) policies. The ATSSS policies can be for specific UE(s); or UEs accessing a DNN, or UEs accessing a network slice instance (e.g. represented by S-NSSAI or NSI-ID); or UEs belonging to an Internal-Group ID to select different access technologies (5G RAN, 4G RAN, WiFi, wireline access network, 3GPP access networks, non-3GPP access trusted and untrusted networks). The ATSSS policies can be for either UL or DL QoS flows or for both UL and DL QoS Flows of the same PDU Session. The ATSSS policies can be for the AMF or SMF to switch traffic flows between different access network technologies, or to split QoS flows of a PDU session to different access technologies in the (R)AN, or to different UPF in the CN. Futyher, the ATSSS policies could be for different times of the day (e.g. from 8:00 am to 9:00 am), for days of the week (e.g. weekdays or weekend, or specific weekdays like Monday, Friday), for specific (R)AN locations (represented by, e.g. (R)AN ID, (R)AN IP Address, (R)AN FQDN, Tracking Area(s), Registration Area(s)), for specific UPF(s) (represented by UPF ID(s), or UPF IP Address(es)), for specific Geographical Zone IDs, for specific network slice(s) (represented by e.g. S-NSSAI, or NSI-ID), for specific applications (e.g. third party video streaming, operator IMS (IP Multimedia Subsystem) voice and video services. A further example includes charging policies. In which case, the PCF may request NWDA to provide charging policies (e.g. cost for connection time, cost for data volume) for different times of the day (e.g. from 8:00 am to 5:00 pm), for days of the week (e.g. weekdays or weekend, or specific weekdays like Monday, Friday), for specific (R)AN locations (represented by, e.g. (R)AN ID, (R)AN IP Address, (R)AN FQDN, Tracking Area(s), Registration Area(s)), for specific UPF(s) (represented by UPF ID(s), or UPF IP Address(es)), for specific Geographical Zone IDs, for specific network slice(s) (represented by e.g. S-NSSAI, or NSI-ID), for different access network technologies (e.g. 5G, 4G, WiFi, 3GPP access networks, non-3GPP access networks), for different ATSSS policies, for different QoS policies.

In yet some other embodiments, the NF 1220 is the AF 250 and the AF 250 send the Network Information Request message 1201a. The Network Information Request message 1201a may include a request for network statistical information. Network statistical information can include statistics of QoS parameters, including the actual minimum, maximum, or average values of QoS parameters the network provided for the PDU Sessions and UEs. These can include, for example, Maximum Bit Rate (MBR), Maximum Flow Bit Rate (MFBR) in UL and DL, Guaranteed Flow Bit Rate (GFBR) in UL and DL, Session Aggregate Maximum Bit Rate (Session-AMBR), UE Aggregate Maximum Bit Rate (UE-AMBR), the packet delay, packet loss rate, maximum data burst volume. Network statistical information can also include statistics of QoS Flows arrived at the network, for example the UL QoS Flows at the UE and the (R)AN node, the DL QoS Flows at the UPF that are network gateways. These statistics show actual traffic demand of UE and application server. The Network statistical information can be requested based on various filteres, such as for different times of the day (e.g. from 8:00 am to 5:00 pm), for days of the week (e.g. weekdays or weekend, or specific weekdays like Monday, Friday), for specific (R)AN locations (represented by, e.g. (R)AN ID, (R)AN IP Address, (R)AN FQDN, Tracking Area(s), Registration Area(s)), for specific UPF(s) (represented by UPF ID(s), or UPF IP Address(es)), for specific Geographical Zone IDs, for specific network slice(s) (represented by e.g. S-NSSAI, or NSI-ID), for different access network technologies (e.g. 5G, 4G, WiFi, 3GPP access networks, non-3GPP access networks), for different ATSSS policies, for different QoS policies, for specific UEs (represented by e.g. UE IDs (SUPI, or GPSI), specific UE group(s) (represented by e.g. Internal Group ID, IMSI Group ID), for some applications (e.g. video streaming, URLLC, IoT smart electricity meters, automated driving V2X applications) which could be represented by Application ID, for UL and/or DL QoS Flows.

In yet some other embodiments, the NF 1220 is the NRF (Network Repository Function) and the NRF sends the Network Information Request message 1201a. The Network Information Request message 1201a may include a request (or subscribe) for network information from the NWDA function 237. The network information may include statistics of utilization of network functions, such as the load statistics of UPF, AMF, SMF, (R)AN nodes, PCF, NEF, wherein the statistics can include minimum, maximum, average values of resource utilization. Further, the statistics can be provided for filtered information, such as the filtered information provided in the request (or subscription) of the PCF 236.

All NFs that require Data Analytics may send a Data Analytics request (or a subscription request) to the NWDA function 237. The Data Analytics request may include a filter for different time of the day (e.g. from 8:00 am to 5:00 pm), for days of the week (e.g. weekdays or weekend, or specific weekdays like Monday, Friday), for specific (R)AN locations (represented by, e.g. (R)AN ID, (R)AN IP Address, (R)AN FQDN, Tracking Area(s), Registration Area(s)), for specific UPF(s) (represented by UPF ID(s), or UPF IP Address(es)), for specific Geographical Zone IDs, for specific network slice(s) (represented by e.g. S-NSSAI, or NSI-ID), for different access network technologies (e.g. 5G, 4G, WiFi, 3GPP access networks, non-3GPP access networks), for different ATSSS policies, for different QoS policies, for specific UEs (represented by e.g. UE IDs (SUPI, or GPSI), specific UE group(s) (represented by e.g. Internal Group ID, IMSI Group ID), for some applications (e.g. video streaming, URLLC, IoT smart electricity meters, automated driving V2X applications) which could be represented by Application ID, for UL and/or DL QoS Flows.

As illustrated in FIG. 12-A and FIG. 12-B, after receiving the network information request (or subscription request) (e.g. 1201a) from the NF 1220, the NWDA function 237 may send a Network Information Request Acknowledgment 1201b to the NF 1220 to confirm the reception of the request.

In some embodiments, the NWDA function 237 may access a database storage containing network data configured by the NMF 270, such as the UDSF 260. In these embodiments the NWDA 237 may perform the data analytics 1213, as illustrated in FIG. 12-C, based on the data in the database provided by the NF 1230, and/or the UE 110, or indicated by the Network Management Function 270 (such as Operation Administration and Management (OAM)). After obtaining the data analytics, the NWDA function 237 may send the network information 1214a, or the recommendation to the NF 1220 that requires data analytics.

Otherwise, the NWDA function 237 may send requests to collect data for data analytics from different network entities. The request may include requesting network parameters and an identifier to identify the request from the NWDA function 237, e.g. Network Measurement Data Request Identifier (NMDR ID).

There could be various options for the NWDA function 237 to request NFs to provide network data, wherein the NFs may include AF 250, AMF 234, SMF 235, UDR, UDM 233, and (R)AN 120. For example, 1240A of FIG. 12-A and 1240B of FIG. 12-B illustrate two different signalling flows for data collections from NFs. All the subsequent messages between the NWDA function 237 and the NFs that provide data related to the same NMDR ID may include the NMDR ID number.

As illustrated by the signalling flow in 1240A of FIG. 12-A, in some embodiments as discussed above with respect to FIG. 6 and FIG. 7, the NWDA function 237 may send measurement request 1202aA to an NF 1230 that provides network data without information indicating where the measurement data could be stored. The measurement request 1202aA may include network data types to be measured and reported, and an NMDR ID. The NF 1230 that provides network data may send an acknowledgement 1202bA to the NWDA function 137. Thus, when the measurement data is available, the NF(s) 1230 may send the measurement data 1203aA to the NWDA function 237. The NWDA function 237 may send an acknowledgment 1203bA to the NF 1230 that provides the data. Further, the NWDA function 237 may send a measurement data storage request message 1204aA to the UDSF 260. The measurement data storage request 1204aA may include network data and network data attributes. The network data attributes may include the time and date of the data, the NF ID that provided the data, the data type (e.g. UE QoS Data, UE QoE Data, Session Management Data, Mobility Management Data), network parameters associated with the data (e.g. PDU Session duration, GFBR, Packet Delay). The UDSF 260 may send a response message 1204bA to confirm the reception and storage of the network data and attributes. If the UDSF 260 is unable to store the network data and the attributes due to some errors (e.g. memory full), the UDSF 260 may send the error message to the NWDA function 237. After receipt of the error message, the NWDA function 237 may resend the measurement data storage request message 1204aB to another UDSF 260 to store the network data and attributes.

Similarly, as illustrated by the signalling flow in 1240B of FIG. 12-B, in some other embodiments, the NWDA function 237 may send the Measurement Request 1202aB to the NF 1230 that provides data. The request may include storage information indicating where the network data can be sent to. The storage information may be an ID of the UDSF 260 (such as UDSF ID, UDSF IP Address, UDSF FQDN). The NF 1230 that provides network data may send a request acknowledgement 1202bB to the NWDA function 237. Thus, when the measurement data is available, the NF 1230 may send a Measurement Data Storage Request message 1203aB to the UDSF 260. The Storage Request 1203aB may include the measured data and the measured data attributes as described for 1204aA. The UDSF 260 may send a Measurement Data Storage Response 1203bB to the NF 1230.

If there is an error, the UDSF 260 may send an error message to the NF 1230. After receipt of the error message, the NF 1230 may notify the NWDA function 237. The NWDA function 237 may find another UDSF and inform the NF 1230. These steps are not shown in FIG. 12-B.

Additionally, in some other embodiments, data may be collected from UE(s) 110, as illustrated by the signalling flow in 1260 of FIG. 12-C. The NWDA function 237 may send to the AMF 234 a request message 1205a for UE to provide usage data. The request message 1205a may include an NMDR ID. The usage data may include PDU Session QoS and/or PDU Session QoE, in which all the details of PDU Session may be included, parameters of PDU Session, such as PDU Session Type (e.g. IPv4, or IPv6, or Ethernet, or Unstructured type), time and data of PDU session, type of application (e.g. video streaming, V2X) or Application ID, RAT type, (R)AN information (e.g. (R)AN ID, (R)AN IP address), assigned QoS parameters (like MBR, GFBR), actually measured QoS parameters, QoE parameters. The request message 1205a may also include an indication to indicate which UEs should provide data, such as the list of UE ID (e.g. SUPI, GPSI), and/or Internal Group ID, and/or S-NSSAI, and/or location information (e.g. (R)AN IDs, CN paging area, registration area, LADN service area, AMF service area, SMF service area, or UPF service area, geographical zone ID, PLMN ID). The AMF 234 may send a UE Measurement Request Acknowledgment 1205b to the NWDA function 237.

The AMF 234 may use the UE information provided by the NWDA function 237 along with the request message 1205a to create N1 MM NAS Measurement Request 1206 to be sent to the UEs 110. There may be several ways that the N1 MM NAS Measurement Request can be sent to the UEs 110, for example by CN paging method, broadcast method, or send the individual N1 MM NAS Measurement Request to each UE 110 as illustrated in FIG. 12-C, according to an embodiment. In such an embodiment, the AMF 234 sends an N1 MM NAS Measurement request 1207a to the (R)AN 120. The (R)AN 120 forwards the N1 MM NAS Measurement request message 1207b to the UE 110. Each UE 110 sends an N1 MM NAS Measurement Response 1208a to the (R)AN 120. The (R)AN 120 forwards the N1 MM NAS response message 1208b received from the UE 110 to the AMF 234. When the measurement data is available, the UE 110 sends the N1 MM NAS Measurement Data 1209a to the (R)AN 120. The (R)AN 120 forwards the N1 MM NAS data message 1209b received from the UE 110 to the AMF 234. The AMF 234 optionally sends an N1 MM NAS Measurement Data Acknowledgment 1210a to the (R)AN 120. The (R)AN 120 forwards the N1 MM NAS data acknowledgment message 1210b received from the (R)AN 120 to the UE110. The AMF 234 sends the Measurement Data message 1211a to the NWDA function 237. The Measurement Data message 1211a may include the UE ID and NMDR ID. The NWDA function 237 sends a Measurement Request Acknowledgment 1211b to the AMF 234. The NWDA function 237 sends to the UDSF 260 a UE Data Storage Request 1212a which include the UE data received from the AMF 234 and attributes of the UE data, such as UE ID, time and data of the data, type of data (e.g. QoS information, QoE information, PDU Session information). The UDSF 260 sends a UE Data Storage Response 1212b to the NWDA function 237. If there is an error (such as memory full), the UDSF 260 may include the error code (or cause) to the NWDA function 237. The NWDA function 237 may select another instance of UDSF function to store the UE measurement data. The NWDA 237 may, in step 1213, perform data analytics based on the data in the database provided by NF 1230, and/or UE, or indicated by the Network Management Function (such as Operation Administration and Management (OAM)). After obtaining the data analytics 1213, the NWDA function 237 sends the network information 1214a, or the recommendation, to the NF 1220 that requires data analytics. For example, if the NF 1220 is the PCF and a policy recommendation was requested, than a policy recommendation based on an analysis of the received measurement data is sent. The NF 1220 may send Network Information Acknowledgement 1214b to the NWDA function 237.

It should be noted that procedures as illustrated in FIGS. 12-A, 12-B, and 12-C could be implemented in different ways. For example, the method to obtain data collection from the UE 110 may be implemented in different ways by using different indirect interfaces.

In some example embodiments, the NWDA function 237 may send a UE Measurement Request to an AF 250 located in a trusted domain. This AF 250 could be owned by the mobile network operator. The UE Measurement Request may include the list of UEs (e.g. represented by SUPI, GPSI, External Group ID, Internal Group ID), or an indication to be sent to all UEs in the PLMN. The AF 250 may send many SMS messages, each for one UE to trigger PDU to establish a PDU Session. The UE may have software to read the SMF message. The UE may establish a PDU Session with an Application Server (AS) in the data network; the AS is controlled by the AF 250. The UE may send measurement data to the AS using this PDU Session. When the measurement data is sufficient for data analytics, the NWDA function 237 may send a request to the AF 250 to indicate the completion of the measurement. The AF 250 may send to each UE 110 an SMS message that requests the UE 110 to release the PDU session used for sending measurement data. The UE 110 then release the PDU session. Alternatively, the AF 250 may send a request to the AS, the AS then send downlink messages, each for one UE to release the PDU session. The UE 110 then initiates the PDU Session Release procedure as defined in 3GPP TS 23.502. The AF 250 may transfer the measurement data stored in the AS to the UDSF 260 anytime the data is available in the AS. Note that the AF 250 may also send data to the UDSF 260 via an NEF.

In FIG. 12, the PCF 236 (or other CP functions) may request (or subscribe) the NWDA function 237 to provide statistical network information. This statistical network information may be evaluated, for example, by the PCF 236 to derive network operation parameters for other network entity. As an example, the PCF 236 may derive URSP policy and send to the UE 110.

Additionally, the signaling flow described in FIGS. 12-A, 12-B and 12-C may also be used for the NF 1220 to unsubscribe for the Network Information Service of the NWDA function 237. For example, the NF 1220 may, send a un-subscription request 1201a to the NWDA function 237 for the Network Information service; the NWDA function 237 may send an indication 1202a to the NF 1230 to stop the measurement. For some NF (such as UE), 1203 and 1204 may be skipped as no measurement data may be collected. The NWDA function 237 may send an indication 1205a to the AMF 234 to stop the measurement towards the UE 110. The procedures of 1207a, 1207b, 1208a and 1208a as described previously could be applied similarly, only the content of N1 MM NAS message may include an indication to stop the measurement and the NMDR ID. Procedures 1209 to 1214 as described previously may be skipped as no more measurement data is sent from the UE 110.

Figure 13:
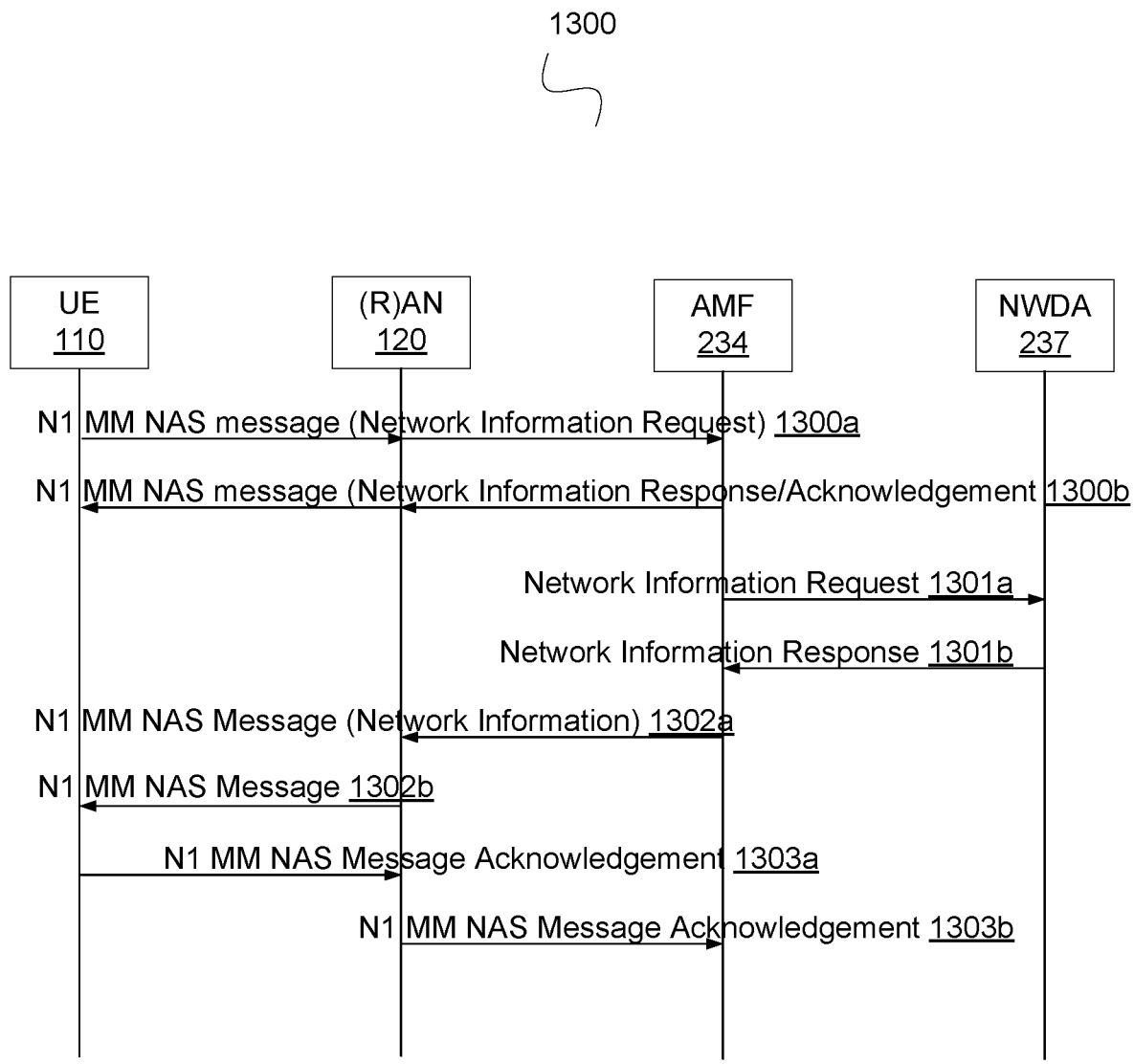
FIG. 13 illustrates, in a message flow diagram, an example of a signaling procedure for an AMF to request Network Information from the NWDA function and then send to UE, in accordance with embodiments of the present invention.

FIG. 13 provides another example, where the AMF 234 may request Network Information from the NWDA function 237 and then process and send to UE 110. As illustrated in FIG. 13, the UE 110 may send a Network Information Request (N1 MM NAS message) in step 1300a to the AMF 234 via (R)AN 120. The Network Information Request (N1 MM NAS message) may include network information requested by the UE 110, such as a map of radio signal coverage, traffic load information of (R)AN node(s), QoS information (e.g. MBR, GFBR) at certain locations (e.g. registration area ID(s), (R)AN ID(s), or the whole PLMN, a network slice (e.g. S-NSSAI)), radio access technology (RAT) type (e.g. 5G RAN, 4G RAN, WiFi)), charging information at a location (e.g. charging rate at different times of the day, different days of the week), application information (e.g. by using Application ID, DNN, LADN ID), a time the UE requested to receive the network information (e.g. within a time period with start time and end time, an indication of a time the network (e.g. serving (R)AN node and neighbor (R)AN nodes) may be congested, periodically (e.g. every days, every weeks, every months), or special events (such as when there are special low charging rate promotion events).

If the AMF 234 has received the network information requested by the UE 110, the AMF 234 may include the network information in the N1 MM NAS message sent at step 1300b. The N1 MM NAS message sent in step 1300b is sent to the UE 110 via the (R)AN 120 to provide the requested network information. If the AMF 234 has not received the network information requested by the UE 110, the AMF 234 may include a network information acknowledgment in the N1 MM NAS message in step 1300b sent to the UE 110 via the (R)AN 120 to acknowledge the reception of the UE 110 request.

The AMF 234 may send a Network Information Request message in step 1301a to (or subscribe to) the NWDA 237 for the average traffic load of (R)AN nodes, some provided QoS parameters (e.g. average MBR, average GFBR), at certain locations, for example by giving (R)AN Addresses, Geographical Zone IDs, Registration Area(s), or the whole PLMN. The Network Information Request message in step 1301a may include network slice information (e.g. represented by S-NSSAI), time of the day, and/or days of week.

The request message in step 1301a may also include specific indication for the NWDA function 237 to provide the time that the (R)AN nodes experience high traffic load. As illustrated in FIG. 13, the NWDA function 237 may, in step 1301b, send a Network Information response to the AMF 234 to provide the requested network information. If the AMF 234 subscribe to the Network Information in step 1301a, by constantly analyze the measurement data, whenever the requested network information changes significantly, the NWDA function 237 may send to the AF 234 the new network information.

As illustrated in FIG. 13, the AMF 234 may, in steps 1302a and 1302b, send N1 MM NAS message to the UE 110 via the (R)AN 120. The message may include the Network Information that the application software (e.g. web browser, video streaming application, social network applications, and the application may be represented by an Application ID) of the UE 110 may use. For example, the video streaming software may perform prefetching to download more video segments of the video the UE is playing if the next serving cell may experience high load. Similarly, the social network application may download new content before the UE moves to the area having poor radio signal coverage. The Network Information may indicate the time of the day that the (R)AN node may experience high load, or the QoS information (e.g. the average MBR, average GFBR) of (R)AN nodes. The AMF 234 may select certain UE(s) to send the Network Information to. For example, the AMF 234 sends network information to the UE 110 that N1 MM NAS message in step 1300a. In another example, the NWDA 237 may inform the AMF 234 which UEs 110 (represented by e.g. UE ID (SUPI, GPSI)) that consume significant data volume at certain time of the day and at certain (R)AN nodes 120. The AMF 234 may also use the user subscription data of the UE stored in the UDM and/or UDR (not shown in FIG. 13), which may include the service level agreement (SLA). If the UE 110 has allowed data volume in a charging period (e.g. in a month) larger than a threshold (e.g. 10 Gbyte), the AMF 234 may send Network Information to that UE 110. The SLA of a UE 110 may also have an indication for special customer care, the AMF 234 may send Network Information to that UE 110. The AMF 234 may then inform the UEs. The AMF 234 may only include the Network Information for the (R)AN nodes that more likely serve the UE 110. The AMF 234 may send to the UE 110 the Network Information of the (R)AN nodes that may experience high load at certain time that the UE 110 access the service. In another example, the AMF 234 may send to the UE 110 a map that shows the radio signal strength. The signal strength map may contain load information and QoS information of (R)AN nodes at different times of the day, or contain the time (e.g. 9:00 am-11:15 am) the (R)AN node may have high load. The Network Information may also contain the charging information for different (R)AN nodes, at different times of the day, different day of the week. The AMF 234 may send the Network Information to the UE 110 at certain times, for example when the network traffic is low, or when the NWDA function 237 provides the Network Information Updates, or when the UE 110 is moving to area that have poor radio signal coverage or the (R)AN nodes that may serve the UE 110 having high load.

As illustrated in FIG. 13, the UE 110 may, in steps 1303a and 1303b, send to the AMF 234 an N1 MM NAS Acknowledgement Message to acknowledge the reception of Network Information via the (R)AN 120.

While FIG. 13 illustrate a method to use N1 MM NAS message to send network information from the CN 130 to the UE 110, in another embodiment, another network function such as SMF 235 or PCF 236 may receive the request for network information from the UE 110, and send network information to the UEs 110.

In FIG. 13, the UE 110 may send a separate N1 MM NAS message to the AMF 234 to request network information in step 1300a. The N1 MM NAS message can be sent at the same time to the UE 110 to perform a registration procedure.

In FIG. 13, the AMF 234 send an N1 MM NAS message 1302a to provide network information to the UE 110. The AMF 234 may also send network information to the UE 100 by using UE Configuration Update procedure described in 3GPP TS 23.502, clause 4.2.4. Specifically, the AMF 234 sends the network information to the UE 110 in step 1 "UE configuration update command" of FIG. 4.2.4.2-1, clause 4.2.4.2 of 3GPP TS 23.502; the PCF or AMF 234 may send network information to the UE in step 1 "NAS transport for UE policy delivery" of FIG. 4.2.4.3-1, clause 4.2.4.3 of 3GPP TS 23.502.

FIG. 13 illustrate a method to use unicast MM NAS message to send network information to the UE 110, in another embodiment, the AMF 234 may use a paging channel to send network information to multiple UEs 110. Alternative, the (R)AN 120 may establish a multicast or broadcast radio bearer to send the network information to multiple UEs 110. The AMF 234 may send a single N2 MM message to the (R)AN node 120, the N2 MM message including network information, the list of UE IDs (or Internal Group ID). Then the (R)AN 120 sends the N2 MM message to multiple UEs 110 by using a multicast or broadcast data radio bearer.

While examples are discussed with respect to point-to-point communication between the network functions, it should be appreciated that the messaging between the network functions can alternatively be implemented using service-based interface (SBI) services.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method comprising:
receiving, from a first network function (NF) or a network management function (NMF), by a network data analytics function (NWDAF), a request for data analytics associated with a load of a second NF over a time period in an area of interest;
collecting, by the NWDAF, data associated with the second NF according to the request;
generating, by the NWDAF, a prediction of a utilization of a resource of the second NF, the prediction being in accordance with the data associated with the second NF in response to the request, wherein the prediction indicates an average value of the load of the second NF over the time period according to the collected data in the area of interest; and
sending, by the NWDAF, the prediction of the utilization of the resource.

2. The method of claim 1, wherein the request includes filter information indicating the second NF.

3. The method of claim 2, wherein the filter information includes a user equipment (UE) identifier associated with the data analytics.

4. The method of claim 2, wherein the filter information includes a network slice identifier.

5. The method of claim 2, wherein the filter information includes an identifier of the second NF.

6. The method of claim 1, wherein the second NF is one of a user plane function (UPF), an access and mobility function (AMF), a session management function (SMF), an access network (AN) node, a policy and control function (PCF), or a network exposure function (NEF).

7. The method of claim 1, wherein the second NF is the UPF, and the data includes a traffic load of the UPF.

8. The method of claim 1, wherein the NWDAF obtains the prediction by performing the data analytics according to the request and the collected data.

9. The method of claim 1, wherein the NWDAF collects the data from an operation administration and management (OAM).

10. The method of claim 1, wherein the NWDAF collects the data from one or more of an application function (AF), an access and mobility function (AMF), a session management function (SMF), a unified data repository (UDR), a unified data management (UDM), or an access network (AN) node.

11. The method of claim 1, wherein the prediction further indicates a maximum value of the load of the NF over the time period.

12. The method of claim 1, wherein the request includes filter information indicating the time period.

13. A method comprising:
sending, by a first network function (NF) or a network management function (NMF), to a network data analytics function (NWDAF), a request for data analytics associated with a load of a second NF over a time period in an area of interest; and
receiving, by the first NF or the NMF, from the NWDAF, a response including a prediction of a utilization of a resource by the second NF, the prediction being in accordance with the load associated with the second NF, wherein the prediction indicates an average value of the load of the second NF over the time period in the area of interest.

14. The method of claim 13, wherein the request includes filter information indicating the second NF.

15. The method of claim 14, wherein the filter information includes a user equipment (UE) identifier associated with the data analytics.

16. The method of claim 14, wherein the filter information includes a network slice identifier.

17. The method of claim 14, wherein the filter information includes an identifier of the second NF.

18. The method of claim 13, wherein the second NF is one of a user plane function (UPF), an access and mobility function (AMF), a session management function (SMF), an access network (AN) node, a policy and control function (PCF), or a network exposure function (NEF).

19. The method of claim 13, wherein the second NF is the UPF, and the data includes a traffic load of the UPF.

20. The method of claim 13, wherein the prediction further indicates a maximum value of the load of the second NF over the time period in the area of interest.

21. The method of claim 13, wherein the prediction is obtained based on the NWDAF's collected data according to the request.

22. An apparatus comprising a processor and a memory storing instructions which when executed by the processor configure the apparatus to execute a method comprising:
  receiving, from a first network function (NF) or a network management function (NMF), a request for data analytics associated with a load of a second NF over a time period in an area of interest;
  collecting data associated with the second NF according to the request;
  generating a prediction of a utilization of a resource by the second NF, the prediction being in accordance with the load associated with the second NF in response to the request, wherein the prediction indicates an average value of the load of the second NF over the time period according to the collected data; and
  sending the prediction of the utilization of the resource.

23. A network server apparatus comprising a processor and a memory storing instructions which when executed by the processor configure the apparatus to execute a method comprising:
  sending, by a first network function (NF) or a network management function (NMF) instantiated by the network server apparatus, to a network data analytics function (NWDAF), a request for data analytics associated with a load of a second NF over a time period in an area of interest; and
  receiving, by the first NF or the NMF, from the NWDAF, a response including a prediction of a utilization of a resource by the second NF, the prediction being in accordance with the load associated with the second NF, wherein the prediction indicates an average value of the load of the second NF over the time period in the area of interest.

* * * * *